US008618228B2

(12) United States Patent
Schuhen et al.

(10) Patent No.: US 8,618,228 B2
(45) Date of Patent: Dec. 31, 2013

(54) PROCESS FOR THE PREPARATION OF ETHYLENE COPOLYMER COMPOSITIONS IN THE PRESENCE OF AN OLIGOMERIZATION CATALYST

(75) Inventors: Katrin Schuhen, Mannheim (DE); Lenka Lukesova, Hofheim (DE); Shahram Mihan, Bad Soden (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 13/521,717

(22) PCT Filed: Jan. 20, 2011

(86) PCT No.: PCT/EP2011/000212
§ 371 (c)(1),
(2), (4) Date: Oct. 2, 2012

(87) PCT Pub. No.: WO2011/089000
PCT Pub. Date: Jul. 28, 2011

(65) Prior Publication Data
US 2013/0023631 A1    Jan. 24, 2013

Related U.S. Application Data

(60) Provisional application No. 61/339,360, filed on Mar. 3, 2010.

(30) Foreign Application Priority Data

Jan. 21, 2010   (EP) .................................... 10000560

(51) Int. Cl.
*B01J 31/00* (2006.01)
*C08F 2/00* (2006.01)

(52) U.S. Cl.
USPC ............................................ 526/75; 502/165

(58) Field of Classification Search
None
See application file for complete search history.

(56) References Cited

U.S. PATENT DOCUMENTS

| 5,527,752 | A | 6/1996 | Reichle et al. | |
| 6,214,761 | B1 | 4/2001 | Bennett | |
| 6,277,778 | B1 | 8/2001 | Leino et al. | |
| 6,555,631 | B1 * | 4/2003 | Wang et al. | 526/113 |

FOREIGN PATENT DOCUMENTS

| DE | 19710615 | 9/1998 |
| EP | 1013674 | 6/2000 |
| WO | WO-9704015 | 7/1996 |
| WO | WO-98/27124 | 6/1998 |
| WO | WO-9822486 | 6/1998 |
| WO | WO-0031090 | 6/2000 |
| WO | WO-0123166 | 4/2001 |
| WO | WO-0123443 | 4/2001 |
| WO | WO-0200339 | 1/2002 |
| WO | WO-03059511 | 7/2003 |
| WO | WO-2005103095 | 11/2005 |
| WO | WO-2005103100 | 11/2005 |
| WO | WO-2006058746 | 6/2006 |
| WO | WO-2007012406 | 2/2007 |
| WO | WO-2008125208 | 10/2008 |

OTHER PUBLICATIONS

Enders, M. et al., "8-Quinaolylcyclopentadienyl, a Ligand with a Tailored Fit for Chelate Complexes" Chem. Ber. 129 1996, 459-463.
Jutzi, P. et al., "Cyclopentadienyl compounds with nitrogen donors in the side-chain" Journal of Organomettalic Chemistry 500 1995 , 175-18.5.
Resconi, Luigi et al., "Selectivity in Propene Polymerization with Metallocene Catalysts", Chem. Rev. 2000, 100 2000 , 1253-1345.
Small, Brooke L. et al., "Highly Active Iron and Cobalt Catalysts for the Polymerization of Ethylene", J.Am. Chem. Soc. 1998 , 4049-4050.
Britovsek, G. et al., "Novel Olefin Polymerization Catalysts based on Iron and Cobalt", Chem. Commun. 1998 , 849-850.
Randall, J. , "A Review of High Resolution Liquid (13) Carbon Nuclear Magnetic Resonance Characterizations of Ethylene-Based Polymers", JMS-Rev. Macromol. Chem. Phys. C29 (2&3) 1989 , 201-317.
Weisenfeldt, Helga , "ansa-Metallocene derivatives; XVII. Racemic and meso diastereomers of group IV metallocene derivatives with symmetrically substituted dimethylsilanediyl-bridged ligand frameworks. Crystal structure of R,S-Me2SI(3-1-Bu-5-MeC5H2)2ZrC12", Journal of Organometallic Chemistry, 369 Elsevier Sequoia S.A., Lausanne—Printed in the Netherlands 1989 , 359-370.
Kakugo, M. et al., Macromolecules, 15, 4, 1150 1982.
Carman, C.J. et al., Macromolecules, 10, 3, 536 1977.
Fieser, Louis et al., "Textbook of Organic Chemistry, Third Revised Edition", Verlag Chemie-GmbH, Weinheim/Bergstr. 1957 1957 , 10 pages.

\* cited by examiner

*Primary Examiner* — Ling Choi
*Assistant Examiner* — Catherine S Branch

(57) ABSTRACT

Process for the preparation of an ethylene copolymer composition having a polydispersity index $M_w/M_n$ of from 3 to 100, comprising a) feeding ethylene to at least one polymerization reactor; b) performing in the at least one polymerization reactor an oligomerization of ethylene in the presence of an oligomerization catalyst component (C) to produce comonomer; c) performing simultaneously in the at least one polymerization reactor polymerization reactions in the presence of catalyst components (A) and (B) producing, respectively, a first and a second polyethylene fraction, wherein the weight average molecular weight $M_w$ of the first polyethylene fraction produced by catalyst component (A) is less than the $M_w$ of the second polyethylene fraction produced by catalyst component (B) and the comonomer incorporation ability of catalyst component (B) is higher than the comonomer incorporation ability of catalyst component (A); and d) withdrawing the ethylene copolymer composition from the polymerization reactor.

9 Claims, No Drawings

PROCESS FOR THE PREPARATION OF ETHYLENE COPOLYMER COMPOSITIONS IN THE PRESENCE OF AN OLIGOMERIZATION CATALYST

This application is the U.S. national phase of International Application PCT/EP2011/000212, filed Jan. 20, 2011, claiming priority to European Application 10000560.2 filed Jan. 21, 2010 and the benefit under 35 U.S.C. 119(e) of U.S. Provisional Application No. 61/339,360, filed Mar. 3, 2010; the disclosures of International Application PCT/EP2011/000212, European Application 10000560.2 and U.S. Provisional Application No. 61/339,360, each as filed, are incorporated herein by reference.

DESCRIPTION

The present invention relates to a process for the preparation of an ethylene copolymer composition having a polydispersity index $M_w/M_n$ of from 3 to 100 in the presence of a catalyst system comprising an oligomerization catalyst component (C), and two different catalyst components (A) and (B).

Polyethylene is the most widely used commercial polymer. Its success is based on the facts that it is not only possible to carry out the production at relatively low costs but that the obtained materials also meet the requirements with respect to good product properties and processability. That means, the obtained polymers have physical properties which are suitable for their end use and that it is easily possible to bring them in the shape of the final articles. Most important for properties and processability of polyethylenes is beside the molecular weight of the polymer chains their branching. One possibility to get short branches into the polymer chains is copolymerizing ethylene with minor amounts of comonomers like 1-olefins, for example 1-butene, 1-hexene or 1-octene. Accordingly, product properties and density of the polyethylenes can be controlled. Thus, the polymers which are called polyethylene are quite often not ethylene homopolymers but ethylene copolymers.

Polyethylenes with an especially good combination of polymer properties and processability are obtained, for example, if for their production catalyst systems are used which comprise components with different comonomer incorporation ability and the component or the components producing a higher molecular weight have higher comonomer incorporation ability than the component or the components producing a lower molecular weight. The preparation of such polyethylenes is inter alia disclosed in WO 2005/103100 or WO 2008/125208.

A disadvantage of using 1-olefins is that these comonomers are more expensive than ethylene. Consequently it would be advantageous if it is no longer necessary to use any of these more costly comonomers or to at least reduce the needed amount for obtaining polyethylenes with the desired combination of good properties and processability. Moreover, it should be possible to easily control the product properties.

WO 01/23166 describes a process for preparing polyethylenes by copolymerizing ethylene and a series of 1-olefins, which have been formed in situ from ethylene during the polymerization process. The so prepared polyethylenes have good melt processing properties and are useful in blow molding, extrusion or extruded blown film processes. Accordingly, a way of preparing acceptable polyethylenes without comonomer is disclosed, however the range of their polymer properties is limited.

Thus, it was the object of the present invention to prepare polyethylenes with at least the good combination of polymer properties and processability which is obtainable if catalyst systems are used in which the lower molecular weight building component has a relatively low comonomer incorporation ability and the high molecular weight building component has a relatively higher comonomer incorporation ability, in a process, in which no or at least a reduced amount of comonomer is required and which however provides a good possibility to control the product properties.

We have found that this object is achieved by a process for the preparation of an ethylene copolymer having a polydispersity index $M_w/M_n$ of from 3 to 100, comprising
a) feeding ethylene to at least one polymerization reactor;
b) performing in the at least one polymerization reactor an oligomerization of ethylene in the presence of an oligomerization catalyst component (C) to produce comonomer;
c) performing simultaneously in the at least one polymerization reactor polymerization reactions in the presence of catalyst components (A) and (B) producing, respectively, a first and a second polyethylene fraction, wherein the weight average molecular weight $M_w$ of the first polyethylene fraction produced by catalyst component (A) is less than the $M_w$ of the second polyethylene fraction produced by catalyst component (B) and the comonomer incorporation ability of catalyst component (B) is higher than the comonomer incorporation ability of catalyst component (A); and
d) withdrawing the ethylene copolymer from the polymerization reactor.

According to the present invention an oligomerization reaction occurs if, under the specific reaction conditions, at least 50 wt.-percent of the products of that reaction are hydrocarbons having from 4 to 30 carbon atoms. Consequently, a polymerization reaction occurs if, under the specific reaction conditions, less than 30 wt.-percent of the products of the reaction are hydrocarbons with from 4 to 30 carbon atoms. A suitable method for determining the proportion of obtained hydrocarbons with from 4 to 30 carbon atoms is gas chromatography-mass spectrometry (GC-MS).

The polyethylenes prepared by the process of the present invention are ethylene copolymers. That means, the structural units forming the polymer chains of the reaction product of step c) do not only come from ethylene as monomer but also result from incorporated comonomers. This does however not imply that all formed polymer chains contain structural units which result from incorporated comonomer. In a preferred embodiment of the present invention the ethylene copolymer compositions are a mixture of polymer chains which are ethylene homopolymer chains and polymer chains which are ethylene copolymer chains. It is however also possible that the ethylene copolymer compositions of the present invention are a mixture of polymer chains with very different comonomer content.

At least a part of the structural units of the ethylene copolymer composition which does not come from incorporated ethylene result from oligomers obtained in step b) of the process of the present invention. That means, these oligomers act as comonomers for the polymerization of step c).

In a preferred embodiment of the present invention additional olefins are fed to the reactor. Suitable olefins are all olefinically unsaturated compounds, which can be copolymerized with ethylene in the polymerization of step c). Suitable comonomers can be functionalized olefinically unsaturated compounds such as ester or amide derivatives of acrylic or methacrylic acid, for example acrylates, methacrylates, or acrylonitrile. Preference is given to nonpolar olefinic compounds, and especially to 1-olefins. Particularly preferred as added olefins are linear or branched $C_3$-$C_{12}$-1-alkenes, in particular linear $C_3$-$C_{10}$-1-alkenes such as propene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,4-hexadiene or 1,7-octadiene, with particular preference given to 1-olefins selected from the group consisting of 1-butene, 1-hexene and 1-octene. Suitable olefins also include ones in which the double bond is part of a cyclic structure which can have one or more ring systems. Examples are cyclopentene, norbornene, tetracyclododecene or methylnorbornene or dienes such as 5-ethylidene-2-norbornene, norbornadiene or ethylnorbornadiene. It is also possible to add mixtures of two or more olefins. The incorporated comonomers for such ethylene copolymer compositions are the mixture of the oligomers obtained in step b) and the additional fed olefins.

The ethylene content of the ethylene copolymer compositions of the present invention is preferably from 50 to 99.9 wt.-% and in particular from 70 to 99 wt.-%. Accordingly the comonomer content, which means the content of the polymer chains of structural units which do not come from directly polymerizing ethylene, is preferably from 0.1 to 50 wt.-% and in particular from 1 to 30 wt.-%.

Preferably from 5% by weight to 90% by weight of the structural units of the ethylene copolymer composition, which result from incorporated comonomer, result from olefin, which was fed to the at least one polymerization reactor, and from 10% by weight to 95% by weight of the structural units of the ethylene copolymer composition, which result from incorporated comonomer, result from comonomer, which was obtained by oligomerization of ethylene according to step b).

The determination of the structure of ethylene copolymers, especially regarding the nature and the amount of incorporated comonomers, is known to a person skilled in the art and very often carried out by NMR-spectroscopy, preferably as $^{13}$C-NMR spectroscopy. In a preferred embodiment the $^{13}$C-NMR spectra are acquired on a Bruker DPX-400 spectrometer operating at 100.61 MHz in the Fourier transform mode at 120° C. The peak $S_{\delta\delta}$ [C. J. Carman, R. A. Harrington and C. E. Wilkes, Macromolecules, 10, 3, 536 (1977)]carbon is used as internal reference at 29.9 ppm. Samples are dissolved in 1,1,2,2-tetrachloroethane-d2 at 120° C. in an amount to end in an 8 wt.-% solution. Each spectrum is acquired with a 90° pulse, 15 seconds of delay between pulses and CPD (WALTZ 16) to remove $^1$H-$^{13}$C coupling. About 1500-2000 transients are stored in 32K data points using a spectral window of 6000 or 9000 Hz. The assignments of the spectra are made referring to M. Kakugo, Y. Naito, K. Mizunuma and T. Miyatake, Macromolecules, 15, 4, 1150, (1982) and J. C. Randal, Macromol. Chem. Phys., C29, 201 (1989).

The ethylene copolymer compositions of the present invention can be monomodal, bimodal or multimodal. With respect to the present invention monomodal, bimodal or multimodal refers to the modality of the molecular weight distribution. A monomodal distribution means that the molecular weight distribution has a single maximum. A bimodal molecular weight distribution means that the molecular weight distribution has at least two points of inflection on one flank. The molar mass distribution is preferably monomodal, bimodal or trimodal and in particular monomodal or bimodal. The ethylene copolymer compositions have in addition to the molecular weight distribution a comonomer distribution, wherein preferably the average comonomer content of polymer chains with a higher molecular weight is higher than the average comonomer content of polymer chains with a lower molecular weight, i.e. the comonomer distribution is a so-called inverse comonomer distribution.

The ethylene copolymer compositions of the present invention have a polydispersity index $M_w/M_n$ in the range of from 3 to 100, preferably from 5 to 60 and especially from 10 to 40. The polydispersity index is calculated by dividing the weight average molecular weight $M_w$ by the number average molecular weight $M_n$. The values $M_w$ and $M_n$ have to be understood as being determined by means of high-temperature gel permeation chromatography using a method based on DIN 55672.

The weight average molecular weight $M_w$ of the ethylene copolymer compositions of the present invention is in the range from 5 000 g/mol to 700 000 g/mol, preferably from 30 000 g/mol to 550 000 g/mol and particularly preferably from 70 000 g/mol to 450 000 g/mol.

The density of preferred ethylene copolymer compositions of the present invention is from 0.86 g/cm$^3$ to 0.955 g/cm$^3$. More preferably the density is in the range of from 0.90 to 0.94 g/cm$^3$ and especially in the range of from 0.915 to 935 g/cm$^3$. The density has to be understood as being the density determined according to DIN EN ISO 1183-1:2004, Method A (Immersion) with compression molded plaques of 2 mm thickness which were pressed at 180° C., 20 MPa for 8 minutes with subsequent crystallization in boiling water for 30 minutes.

The catalyst system, which is used in the process of the present invention to produce the ethylene copolymer compositions, comprises catalyst components (A) and (B), oligomerization catalyst component (C) and optionally compounds (D), which can be added as cocatalyst, for instance to enhance the activity of some or all catalyst components. The two polymerization catalyst components (A) and (B) in the presence of a mixture of ethylene and 1-olefins under identical polymerization conditions different polyethylenes, which differ as well in the average molecular weight as in the comonomer content. At this, catalyst component (A), which produces the polyethylene with the lower $M_w$, has lower comonomer incorporation ability than catalyst component (B), which produces the polyethylene with the higher $M_w$. Therefore, the first polyethylene fraction produced by catalyst component (A) has not only the lower $M_w$ but has also a lower comonomer content than the second polyethylene fraction produced by catalyst component (B).

Catalyst component (A), which produces under identical reaction condition a polyethylene with a lower molecular weight and a lower comonomer content than a polyethylene obtained by catalyst component (B), is preferably a late transition metal compound which is active for olefin polymers by coordination polymerization, preferably having a tridentate ligand bearing at least two substituents different from hydrogen at the atoms binding to the late transition metal, particularly having a tridentate ligand bearing at least two ortho, ortho'-disubstituted aryl radicals and especially having a bisiminopyridyl ligand bearing two ortho-ortho'-disubstituted aryl radicals. Preferred late transition metals are those of groups 8 to 10 of the Periodic Table of Elements and in particular selected from the group consisting of iron nickel, palladium, and cobalt. Particularly preferred are catalyst components based on iron or cobalt.

Especially preferred catalysts components (A) are iron or cobalt complexes of general formula (I)

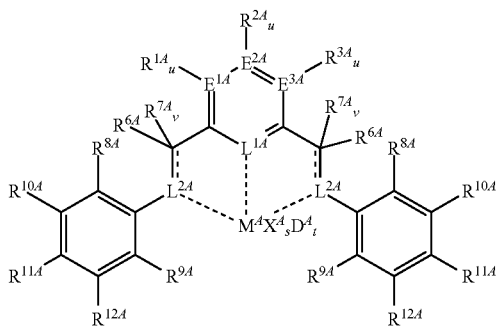

(I)

where the substituents and indices have the following meaning.

$L^{1A}$ and $L^{2A}$ are each, independently of one another, nitrogen or phosphorus, preferably nitrogen, $E^{1A}$ to $E^{3A}$ independently of one another are carbon, nitrogen or phosphorus and preferably carbon, $R^{1A}$ to $R^{3A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{40}$-aryl, arylalkyl having from 1 to 16 carbon atoms in the alkyl part and 6 to 20 carbon atoms in the aryl part, $-NR^{4A}{}_2$, $-OR^{4A}$, or $-SiR^{5A}{}_3$ or a five-, six- or seven-membered heterocycle, which comprises at least one atom from the group consisting of nitrogen, phosphorus, oxygen and sulfur, where the radicals $R^{1A}$ to $R^{3A}$ may also be substituted by halogen, $-NR^{4A}{}_2$, $-OR^{4A}$, or $-SiR^{5A}{}_3$ and/or two radicals $R^{1A}$ to $R^{3A}$, in particular adjacent radicals, together with the atoms connecting them may be joined to form a preferably 5-, 6- or 7-membered ring or a preferably 5-, 6- or 7-membered heterocycle which comprises at least one atom selected from the group consisting of nitrogen, phosphorus, oxygen and sulfur, where $R^{4A}$ can be identical or different and can each be hydrogen, $C_1$-$C_{22}$-alkyl, $C_2$-$C_{22}$-alkenyl, $C_6$-$C_{40}$-aryl, arylalkyl having from 1 to 16 carbon atoms in the alkyl part and from 6 to 20 carbon atoms in the aryl part, or $-SiR^{5A}{}_3$ where the radicals $R^{4A}$ may also be substituted by halogen, and/or two radicals $R^{4A}$ may also be joined to form a 5-, 6- or 7-membered ring, $R^{5A}$ can be identical or different and can each be hydrogen, $C_1$-$C_{22}$-alkyl, $C_2$-$C_{22}$-alkenyl, $C_6$-$C_{40}$-aryl, arylalkyl having from 1 to 16 carbon atoms in the alkyl part and from 6 to 20 carbon atoms in the aryl part and/or two radicals $R^{5A}$ may also be joined to form a 5-, 6- or 7-membered ring, u independently of one another are 0 for $E^{1A}$ to $E^{3A}$ being nitrogen or phosphorus and 1 for $E^{1A}$ to $E^{3A}$ being carbon, $R^{6A}$ and $R^{7A}$ are each, independently of one another, hydrogen, $C_1$-$C_{22}$-alkyl, $C_2$-$C_{22}$-alkenyl, $C_6$-$C_{40}$-aryl, arylalkyl having from 1 to 16 carbon atoms in the alkyl part and 6 to 20 carbon atoms in the aryl part, $-NR^{5A}{}_2$, or $-SiR^{4A}{}_3$, where the radicals $R^{6A}$ and $R^{7A}$ may also be substituted by halogen and/or two radicals $R^{6A}$ and $R^{7A}$, may be joined to form a preferably 5-, 6- or 7-membered ring or a preferably 5-, 6- or 7-membered heterocycle which comprises at least one atom selected from the group consisting of nitrogen, phosphorus, oxygen and sulfur, v independently of one another, are 0 or 1, and when v is 0 the bond between $L^{2A}$ and the carbon atom bearing radical $R^{6A}$ is a double bond, $R^{8A}$ to $R^{12A}$ are each, independently of one another, $C_1$-$C_{20}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and 6-20 carbon atoms in the aryl radical, halogen, $-NR^{13A}{}_2$, $-OR^{13A}$ or $-SiR^{13A}{}_3$, where the organic radicals $R^{8A}$ to $R^{12A}$ may also be substituted by halogens and/or two vicinal radicals $R^{8A}$ to $R^{12A}$ may also be joined to form a five-, six- or seven-membered ring, and/or two vicinal radicals $R^{8A}$ to $R^{12A}$ are joined to form a five-, six- or seven-membered heterocycle which comprises at least one atom selected from the group consisting of nitrogen, phosphorus, oxygen and sulfur, or $R^{10A}$ to $R^{12A}$ are, independently of one another, hydrogen, the radicals $R^{13A}$ are each, independently of one another, hydrogen, $C_1$-$C_{20}$-alkyl, $C_2$-$C_{20}$-alkenyl, $C_6$-$C_{40}$-aryl, alkylaryl having from 1 to 10 carbon atoms in the alkyl part and 6-20 carbon atoms in the aryl part, where the organic radicals $R^{13A}$ may also be substituted by halogens or nitrogen- and oxygen-comprising groups and two radicals $R^{13A}$ may also be joined to form a five- or six-membered ring, $M^A$ is iron or cobalt, preferably iron $X^A$ independently of one another are fluorine, chlorine, bromine, iodine, hydrogen, $C_1$-$C_{10}$-alkyl, $C_2$-$C_{10}$-alkenyl, $C_6$-$C_{40}$-aryl, arylalkyl having 1 to 16 carbon atoms in the alkyl part and 6 to 20 carbon atoms in the aryl part, $-NR^{14A}{}_2$, $-OR^{14A}$, $-SR^{14A}$, $-SO_3R^{14A}$, $-OC(O)R^{14A}$, $-CN$, $-SON$, β-diketonate, $-CO$, $BF_4{}^-$, $PF_6{}^-$ or bulky non-coordinating anions, wherein the organic radicals $X^A$ can also be substituted by halogens and/or at least one radical $R^{14A}$, and the radicals $X^A$ are optionally bonded with one another, $R^{14A}$ independently of one another are hydrogen, $C_1$-$C_{22}$-alkyl, $C_2$-$C_{22}$-alkenyl, $C_6$-$C_{40}$-aryl, arylalkyl having 1 to 16 carbon atoms in the alkyl part and 6 to 20 carbon atoms in the aryl part, or $SiR^{15A}{}_3$, wherein the organic radicals $R^{14A}$ can also be substituted by halogens, and/or in each case two radicals $R^{14A}$ can also be bonded with one another to form a five- or six-membered ring, $R^{15A}$ independently of one another are hydrogen, $C_1$-$C_{20}$-alkyl, $C_2$-$C_{20}$-alkenyl, $C_6$-$C_{40}$-aryl, arylalkyl having 1 to 16 carbon atoms in the alkyl part and 6 to 20 carbon atoms in the aryl part, wherein the organic radicals $R^{15A}$ can also be substituted by halogens, and/or in each case two radicals $R^{15A}$ can also be bonded with one another to form a five- or six-membered ring, s is 1, 2, 3 or 4, $D^A$ is an uncharged donor and t is 0 to 4.

In general formula (I), the three atoms $E^{1A}$, $E^{2A}$ and $E^{3A}$ can be identical or different. If one of them is phosphorus, then the other two are preferably each carbon. If one of them is nitrogen, then the other two are each preferably nitrogen or carbon, in particular carbon.

In general formula (I) the respective two radicals $R^{8A}$ to $R^{12A}$ can be the same or different. Preferably both substituents $R^{8A}$ to $R^{12A}$ formula (I) of are the same. Preferably at least one radical of the group consisting of $R^{8A}$, $R^{9A}$ and $R^{11A}$ is fluorine, chlorine, bromine, iodine, $-OR^{13A}$ or $-CF_3$.

Preferred iron or cobalt compounds may be found in patent application WO 2005/103100.

Especially preferred catalysts components (A) of general formula (I) are 2,6-bis[1-(2-chloro-4,6-dimethylphenylimino)ethyl]pyridine iron(II) chloride; 2,6-bis[1-(2-chloro-6-methylphenylimino)ethyl]pyridine iron(II) dichloride, 2,6-bis[1-(2,6-dichlorophenylimino)ethyl]pyridine iron (II) dichloride, 2,6-bis[1-(2,4-dichloro-6-methylphenylimino)ethyl]pyridine iron(II) dichloride, 2,6-bis[1-(2,6-difluorophenylimino)ethyl]-pyridine iron(II) dichloride, 2,6-bis[1-(2,6-dibromophenylimino)ethyl]-pyridine iron(II) dichloride, 2,6-bis[1-(2,4,6-trimethylphenylimino)ethyl]pyridine iron(II) chloride, 2,6-bis[1-(2-fluoro-6-methylphenylimino)ethyl]pyridine iron(II) chloride or 2,6-bis[1-(2-fluoro-4,6-dimethylphenylimino)ethyl]pyridine iron(II) chloride or the respective dibromides or tribromides.

The preparation of suitable iron complexes is described, for example, in J. Am. Chem. Soc. 120, p. 4049 ff. (1998), J. Chem. Soc., Chem. Commun. 1998, 849, and WO 98/27124.

Catalyst component (B), which produces under identical reaction condition a polyethylene with a higher molecular weight and a higher comonomer content than a polyethylene obtained by catalyst component (A), can be a Ziegler component B1) or an organometallic transition metal compound B2) of a transition metal of groups 3 to 12 of the Periodic Table or the lanthanides or a Phillips component B3).

Suitable catalyst components B1) of the Ziegler type preferably comprises a solid component comprising a compound of titanium or vanadium, a compound of magnesium and optionally but preferably a particulate inorganic oxide as support.

As titanium compounds, use is generally made of the halides or alkoxides of trivalent or tetravalent titanium, with titanium alkoxy halogen compounds or mixtures of various titanium compounds also being possible. Examples of suitable titanium compounds are $TiBr_3$, $TiBr_4$, $TiCl_3$, $TiCl_4$, $Ti(OCH_3)Cl_3$, $Ti(OC_2H_5)Cl_3$, $Ti(O\text{-}i\text{-}C_3H_7)Cl_3$, $Ti(O\text{-}n\text{-}C_4H_9)C_{13}$, $Ti(OC_2H_5)Br_3$, $Ti(O\text{-}n\text{-}C_4H_9)Br_3$, $Ti(OCH_3)_2Cl_2$, $Ti(OC_2H_5)_2Cl_2$, $Ti(O\text{-}n\text{-}C_4H_9)_2Cl_2$, $Ti(OC_2H_5)_2Br_2$, $Ti(OCH_3)_3Cl$, $Ti(OC_2H_5)_3Cl$, $Ti(O\text{-}n\text{-}C_4H_9)_3Cl$, $Ti(OC_2H_5)_3Br$, $Ti(OCH_3)_4$, $Ti(OC_2H_5)_4$ or $Ti(O\text{-}n\text{-}C_4H_9)_4$. Preference is given to using titanium compounds which comprise chlorine as the halogen. Preference is likewise given to titanium halides which comprise only halogen in addition to titanium and among these especially titanium chlorides and in particular titanium tetrachloride. Among the vanadium compounds, particular mention may be made of the vanadium halides, the vanadium oxyhalides, the vanadium alkoxides and the vanadium acetylacetonates. Preference is given to vanadium compounds in the oxidation states 3 to 5.

In the production of the solid component, at least one compound of magnesium is preferably additionally used. Suitable compounds of this type are halogen-comprising magnesium compounds such as magnesium halides and in particular the chlorides or bromides and magnesium compounds from which the magnesium halides can be obtained in a customary way, e.g. by reaction with halogenating agents. For the present purposes, halogens are chlorine, bromine, iodine or fluorine or mixtures of two or more halogens, with preference being given to chlorine or bromine and in particular chlorine.

Possible halogen-comprising magnesium compounds are in particular magnesium chlorides or magnesium bromides. Magnesium compounds from which the halides can be obtained are, for example, magnesium alkyls, magnesium aryls, magnesium alkoxy compounds or magnesium aryloxy compounds or Grignard compounds. Suitable halogenating agents are, for example, halogens, hydrogen halides, $SiCl_4$ or $CCl_4$ and preferably chlorine or hydrogen chloride.

Examples of suitable, halogen-free compounds of magnesium are diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium. Among these, preference is given to using n-butylethylmagnesium or n-butyloctylmagnesium.

Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

As magnesium compounds for producing the particulate solids, preference is given to using, apart from magnesium dichloride or magnesium dibromide, the di($C_1$-$C_{10}$-alkyl) magnesium compounds.

Suitable organometallic transition metal compounds B2) are in principle all compounds of the transition metals of groups 3 to 12 of the Periodic Table or the lanthanides, which comprise organic groups and form, after reaction with a cocatalyst and, if appropriate, organometallic compounds, active catalysts for polymerizing ethylene and 1-olefins. Such organometallic transition metal compounds B2) are usually compounds in which at least one monodentate or polydentate ligand is bound via sigma or pi bonds to the central atom. Possible ligands include both ligands comprising cyclopentadienyl units and ligands which are free of cyclopentadienyl units. Chem. Rev. 2000, Vol. 100, No. 4, describes many such compounds which are suitable for olefin polymerization. Furthermore, multinuclear cyclopentadienyl complexes are also suitable for olefin polymerization.

Suitable transition metal complexes are, in particular, complexes having at least one cyclopentadienyl-type ligand, with those having two cyclopentadienyl-type ligands generally being referred to as metallocene complexes. Particularly well-suited complexes are complexes of the general formula (II)

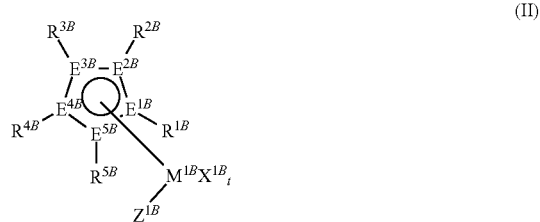

(II)

where the substituents and indices have the following meanings:

$M^{1B}$ is titanium, zirconium, hafnium, vanadium, niobium, tantalum, chromium, molybdenum or tungsten or an element of group 3 of the Periodic Table or the lanthanides, the radicals $X^{1B}$ are identical or different and are each, independently of one another, fluorine, chlorine, bromine, iodine, hydrogen, $C_1$-$C_{10}$-alkyl, 5- to 7-membered cycloalkyl or cycloalkenyl, $C_2$-$C_{10}$-alkenyl, $C_6$-$C_{40}$-aryl, arylalkyl having from 1 to 16 carbon atoms in the alkyl radical and from 6 to 20 carbon atoms in the aryl radical, —$OR^{6B}$ or —$NR^{6B}R^{7B}$, or two radicals $X^{1B}$ are joined to one another and form, for example, a substituted or unsubstituted diene ligand, in particular a 1,3-diene ligand, or a biaryloxy group or form a ligand of the following group

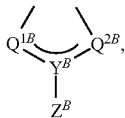

where
$Q^{1B}$ and $Q^{2B}$ are each —O—, —$NR^{6B}$, —$CR^{6B}R^{7B}$— or —S— and $Q^{1B}$ and $Q^{2B}$ are bound to $M^{1B}$,
$Y^B$ is oxygen or sulfur and
$Z^B$ is —$OR^{6B}$, —$SR^{6B}$, —$NR^{6B}R^{7B}$, —$PR^{6B}R^{7B}$, hydrogen, $C_1$-$C_{10}$-alkyl, 5- to 7-membered cycloalkyl or cycloalkenyl, $C_2$-$C_{10}$-alkenyl, $C_6$-$C_{40}$-aryl, arylalkyl having from 1 to 16 carbon atoms in the alkyl radical and from 6 to 20 carbon atoms in the aryl radical or —$SiR^{8B}_3$,
t is 1, 2 or 3 and is such that, depending on the valence of $M^{1B}$, the complex of the general formula (II) is uncharged,
$E^{1B}$ to $E^{5B}$ are each carbon or not more than one $E^{1B}$ to $E^{5B}$ is phosphorus or nitrogen, preferably carbon,
$R^{1B}$ to $R^{5B}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{40}$-aryl, —$NR^{8B}_2$, —$N(SiR^{8B}_3)_2$, —$OR^{8B}$, —$OSiR^{8B}_3$, —$SiR^{8B}_3$, where the radicals $R^{1B}$ to $R^{5B}$ may also be substituted by halogen and/or two radicals $R^{1B}$ to $R^{5B}$, in particular adjacent radicals, together with the atoms connecting them may be joined to form a preferably 5-, 6- or 7-membered ring or a preferably 5-, 6- or 7-membered heterocycle which comprises at least one atom selected from the group consisting of nitrogen, phosphorus, oxygen and sulfur,
$R^{6B}$ and $R^{7B}$ are each, independently of one another, $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 16 carbon atoms in the alkyl radical and from 6 to 20 carbon atoms in the aryl radical or —$SiR^{8B}_3$, where the radicals $R^{6B}$ and $R^{7B}$ may also be substituted by halogens and/or two radicals $R^{6B}$ and $R^{7B}$ may also be joined to form a 5-, 6- or 7-membered ring,
the radicals $R^{8B}$ can be identical or different and can each be $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 16 carbon atoms in the alkyl radical and from 6 to 20 carbon atoms in the aryl radical, $C_1$-$C_{10}$-alkoxy or $C_6$-$C_{10}$-aryloxy, where the radicals $R^{8B}$ may also be substituted by halogens and/or two radicals $R^{8B}$ may also be joined to form a 5-, 6- or 7-membered ring,
$Z^{1B}$ is as defined for $X^{1B}$ or is

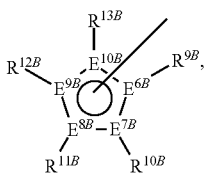

where the radicals
$R^{9B}$ to $R^{13B}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{40}$-aryl, arylalkyl having from 1 to 16 carbon atoms in the alkyl radical and 6 to 20 carbon atoms in the aryl radical, —$NR^{14B}_2$, —$N(SiR^{14B}_3)_2$, —$OR^{14B}$, —$OSiR^{14B}_3$ or where the radicals $R^{9B}$ to $R^{13B}$ may also be substituted by halogen and/or two radicals $R^{9B}$ to $R^{13B}$, in particular adjacent radicals, together with the atoms connecting them may be joined to form a preferably 5-, 6- or 7-membered ring or a preferably 5-, 6- or 7-membered heterocycle which comprises at least one atom selected from the group consisting of nitrogen, phosphorus, oxygen and sulfur, where
the radicals $R^{14B}$ can be identical or different and can each be $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 16 carbon atoms in the alkyl radical and from 6 to 20 carbon atoms in the aryl radical, $C_1$-$C_{10}$-alkoxy or $C_6$-$C_{10}$-aryloxy, where the organic radicals $R^{14B}$ may also be substituted by halogens and/or two radicals $R^{14B}$ may also be joined to form a 5-, 6- or 7-membered ring, and
$E^{6B}$ to $E^{10B}$ are each carbon or not more than one $E^{6B}$ to $E^{10B}$ is phosphorus or nitrogen, preferably carbon,
or the radicals $R^{4B}$ and $Z^{1B}$ together form a —$R^{15B}_v$-$A^{1B}$- group in which
$R^{15B}$ is

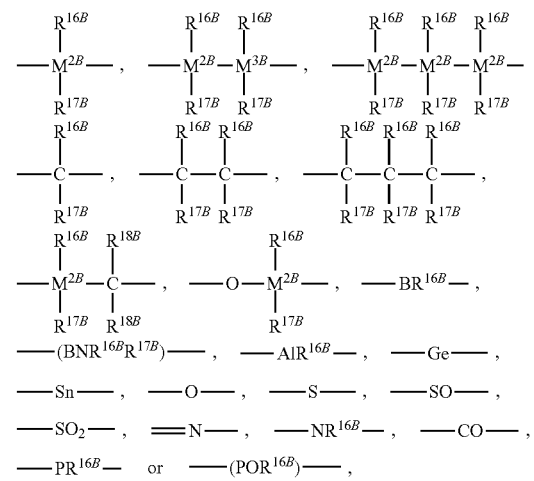

where
$R^{16B}$ and $R^{17B}$ are each, independently of one another, identical or different and are hydrogen, halogen, trimethylsilyl, $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 16 carbon atoms in the alkyl radical and from 6 to 20 carbon atoms in the aryl radical, $C_1$-$C_{10}$-alkoxy or $C_6$-$C_{10}$-aryloxy, where the organic radicals $R^{16B}$ or $R^{17B}$ may also be substituted by halogens and/or two radicals $R^{16B}$ or $R^{17B}$ may also be joined to form a 5-, 6- or 7-membered ring, and
$M^{2B}$ are each, independently of one another, silicon, germanium or tin, preferably silicon,
$A^{1B}$ is —O—, —S—, —$NR^{18B}$—, —$PR^{18B}$—, —$OR^{18B}$, —$NR^{18B}_2$, —$PR^{18B}_2$ or an unsubstituted, substituted or fused, heterocyclic ring system, where
the radicals $R^{18B}$ are each, independently of one another, $C_1$-$C_{10}$-alkyl, 5- to 7-membered cycloalkyl, cycloalkenyl, $C_2$-$C_{22}$-alkenyl, $C_6$-$C_{40}$-aryl or arylalkyl having from 1 to 16 carbon atoms in the alkyl radical and from 6 to 20 carbon atoms in the aryl radical or $Si(R^{19B})_3$, where the organic radicals $R^{18B}$ may also be substituted by halogens and/or two radicals $R^{18B}$ may also be joined to form a 5-, 6- or 7-membered ring, $R^{19B}$ is hydrogen, $C_1$-$C_{10}$-alkyl, 5- to 7-membered cycloalkyl, cycloalkenyl, $C_2$-$C_{22}$-alkenyl, $C_6$-$C_{40}$-aryl or arylalkyl having from 1 to 16 carbon atoms in the alkyl radical and from 6 to 20 carbon atoms in the aryl radical, where the organic radicals $R^{19B}$ may also be substituted by halogens and/or two radicals $R^{19B}$ may also be joined to form a 5-, 6- or 7-membered ring, v is 1 or when $A^{1B}$ is an unsubstituted, substituted or fused heterocyclic ring system may be 1 or 0, or the radicals $R^{4B}$ and $R^{12B}$ together form a —$R^{15B}$- group.

The synthesis of such complexes can be carried out by methods known per se, with preference being given to reacting the appropriately substituted, cyclic hydrocarbon anions with halides of titanium, zirconium, hafnium or chromium.

For the purposes of the present invention, alkyl is a linear or branched alkyl such as methyl, ethyl, $A^{1B}$ A together with the bridge $R^{15B}$ can, for example, form an amine, ether, thioether or phosphine. However, $A^{1B}$ can also be an unsubstituted, substituted or fused, heterocyclic aromatic ring system which can comprise heteroatoms from the group consisting of oxygen, sulfur, nitrogen and phosphorus in addition to ring carbons. The 5-membered and 6-membered heteroaryl groups may also be substituted by $C_1$-$C_{10}$-alkyl, $C_6$-$C_{10}$-aryl, arylalkyl having from 1 to 16 carbon atoms in the alkyl radical and 6 to 20 carbon atoms in the aryl radical, trialkylsilyl or halogens such as fluorine, chlorine or bromine or be fused with one or more aromatics or heteroaromatics. Naming and numbering of the heterocycles has been taken from L. Fieser and M. Fieser, Lehrbuch der organischen Chemie, 3rd revised edition, Verlag Chemie, Weinheim 1957.

The radicals $X^{1B}$ in the general formula (II) are preferably identical, preferably fluorine, chlorine, bromine, $C_1$-$C_7$-alkyl or arylalkyl, in particular chlorine, methyl or benzyl.

This type of complexes of the formula (II) also includes, for the purposes of the present invention, compounds having at least one ligand which is formed by a cyclopentadienyl or heterocyclopentadienyl with a fused-on heterocycle, with the heterocycles preferably being aromatic and comprising nitrogen and/or sulfur. Such compounds are described, for example, in WO 98/22486.

Among the complexes of the general formula (II), particular preference is given to those of the general formulae (IIa) to (IId)

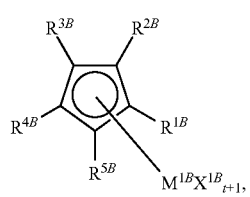

(IIa)

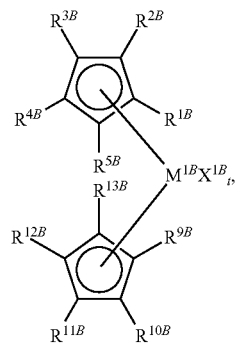

(IIb)

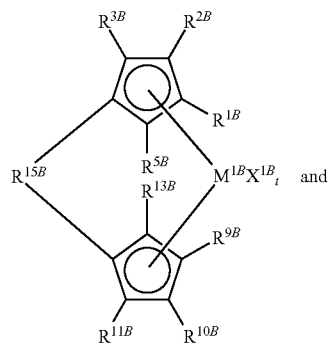

(IIc) and

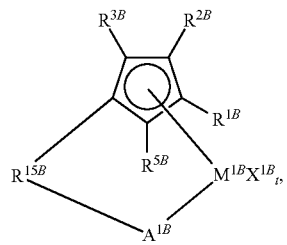

(IId)

where the substituents and indices have the above-defined meaning.

Among the complexes of the formula (IIa), particular preference is given to those in which $M^{1B}$ is titanium, zirconium or hafnium, the radicals $X^{1B}$ are identical or different and are each, independently of one another, chlorine, $C_1$-$C_4$-alkyl, phenyl, alkoxy or aryloxy, a carboxylate of the formula —O—C(O)—$R^{6B}$ or a carbamate of the formula —O—C(O)—$NR^{6B}R^{7B}$, t is 1 or 2, preferably 2, $R^{1B}$ to $R^{5B}$ are each hydrogen or $C_1$-$C_6$-alkyl or two adjacent radicals $R^{1B}$ to $R^{5B}$ together with the atoms connecting them form a substituted or unsubstituted 5-, 6- or 7-membered ring, in particular a substituted or unsubstituted benzo group 6-membered ring, and $R^{6B}$ and $R^{7B}$ are each $C_1$-$C_{10}$-alkyl, $C_6$-$C_{40}$-aryl or arylalkyl having from 1 to 16 carbon atoms in the alkyl radical and from 6 to 20 carbon atoms in the aryl radical.

The preparation of such compounds (IIa) and particularly preferred embodiments of the compounds (IIa) are described, for example, in U.S. Pat. No. 5,527,752.

Among the unbridged metallocene complexes of the formula (IIb), preference is given to those in which $M^{1B}$ is zirconium, hafnium or chromium, $X^{1B}$ is fluorine, chlorine, bromine, $C_1$-$C_4$-alkyl or benzyl, or two radicals $X^{1B}$ form a substituted or unsubstituted diene ligand, t is zero in the case of chromium, otherwise 1 or 2 and preferably 2, $R^{1B}$ to $R^{5B}$ are each hydrogen, $C_1$-$C_8$-alkyl, $C_6$-$C_{10}$-aryl, —$NR^{8B}{}_2$, —$OSiR^{8B}{}_3$ or —$Si(R^{8B})_3$, $R^{9B}$ to $R^{13B}$ are each hydrogen, $C_1$-$C_8$-alkyl, $C_6$-$C_{10}$-aryl, —$NR^{14B}{}_2$, —$OSiR^{14B}{}_3$ or —$Si(R^{14B})_3$ and $R^{8B}$ and $R^{14B}$ are identical or different and are each $C_1$-$C_{10}$-alkyl, 5- to 7-membered cycloalkyl or cycloalkenyl, $C_6$-$C_{40}$-aryl, $C_1$-$C_{10}$-alkoxy or $C_6$-$C_{10}$-aryloxy, where the radicals $R^{8B}$ and $R^{14B}$ may also be substituted by halogens and/or two radicals $R^{8B}$ or $R^{14B}$ may also be joined to form a five-, six- or seven-membered ring, or two radicals $R^{1B}$ to $R^{5B}$ and/or $R^{9B}$ to $R^{13B}$ together with the $C_5$ ring form an indenyl, fluorenyl or substituted indenyl or fluorenyl system.

The complexes of the formula (IIb) in which the radicals containing cyclopentadienyl units are identical, for example substituted or non-substituted bis(cyclopentadienyl)chromium or bis(indenyl)chromium, are particularly useful.

Further examples of particularly useful complexes of the formula (IIb) are those in which $M^{1B}$ is hafnium, $X^{1B}$ is fluorine, chlorine, bromine, $C_1$-$C_4$-alkyl or benzyl, or two radicals $X^{1B}$ form a substituted or unsubstituted diene ligand, t is 2, $R^{1B}$ to $R^{5B}$ are each hydrogen, $C_1$-$C_8$-alkyl or $C_6$-$C_{10}$-aryl, $R^{9B}$ to $R^{13B}$ are each hydrogen, $C_1$-$C_8$-alkyl or $C_6$-$C_{10}$-aryl, $R^{8B}$ and $R^{14B}$ are identical or different and are each $C_1$-$C_{10}$-alkyl, 5- to 7-membered cycloalkyl or cycloalkenyl, $C_6$-$C_{40}$-aryl, $C_1$-$C_{10}$-alkoxy or $C_6$-$C_{10}$-aryloxy, where the radicals $R^{8B}$ and $R^{14B}$ may also be substituted by halogens and/or two radicals $R^{8B}$ or $R^{14B}$ may also be joined to form a five-, six- or seven-membered ring, or two radicals $R^{1B}$ to $R^{5B}$ and/or $R^{9B}$ to $R^{13B}$ together with the $C_5$ ring form an indenyl, fluorenyl or substituted indenyl or fluorenyl system.

A further preferred group of complexes (IIb) comprises those in which:

$M^{1B}$ is zirconium, $X^{1B}$ is fluorine, chlorine, bromine, $C_1$-$C_4$-alkyl or benzyl, or two radicals $X^{1B}$ form a substituted or unsubstituted diene ligand, t is 1 or 2, preferably 2, $R^{1B}$ to $R^{5B}$ are each hydrogen, $C_1$-$C_8$-alkyl, $C_6$-$C_{10}$-aryl, —$OSiR^{8B}{}_3$, $R^{9B}$ to $R^{13B}$ are each hydrogen, $C_1$-$C_8$-alkyl or $C_6$-$C_{10}$-aryl or —$OSiR^{14B}{}_3$ and $R^{8B}$ and $R^{14B}$ are identical or different and are each $C_1$-$C_{10}$-alkyl, 5- to 7-membered cycloalkyl or cycloalkenyl, $C_6$-$C_{15}$-aryl, $C_1$-$C_{10}$-alkoxy or $C_6$-$C_{10}$-aryloxy, where the organic radicals $R^{8B}$ and $R^{14B}$ may also be substituted by halogens and/or two radicals $R^{8B}$ or $R^{14B}$ may also be joined to form a five-, six- or seven-membered ring, or two radicals $R^{1B}$ to $R^{5B}$ and/or $R^{9B}$ to $R^{13B}$ together with the $C_5$ ring form an indenyl, fluorenyl or substituted indenyl or fluorenyl system.

The preparation of such systems and preferred embodiments are disclosed, for example, in FI-A-960437.

Catalyst components based on the unbridged metallocenes mentioned are particularly suitable for producing the higher molecular weight polymer component. They are also particularly suitable for producing the polymer component having a higher comonomer content. These catalyst components are particularly preferably used for producing a comonomer-rich, higher molecular weight polymer component.

Particularly useful complexes of the formula (IIc) are those in which $R^{15B}$ is

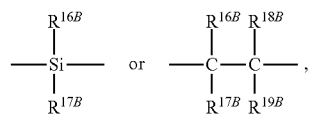

$M^{1B}$ is titanium, zirconium or hafnium, in particular zirconium or hafnium, the radicals $X^{1B}$ are identical or different and are each chlorine, $C_1$-$C_4$-alkyl, benzyl, phenyl or $C_7$-$C_{18}$-alkylaryloxy.

As complexes of the formula (IIc), preference is also given to using bridged bisindenyl complexes in the rac or pseudo-rac form, with the term pseudo-rac referring to complexes in which the two indenyl ligands are in the rac arrangement relative to one another when all other substituents of the complex are disregarded.

The synthesis of such complexes can be carried out by methods known per se, with preference being given to reacting the appropriately substituted, cyclic hydrocarbon anions with halides of titanium, zirconium, hafnium, vanadium, niobium, tantalum or chromium. Examples of appropriate preparative methods are described, inter alia, in Journal of Organometallic Chemistry, 369 (1989), 359-370.

Particularly useful complexes of the general formula (IId) are those in which $M^{1B}$ is titanium or zirconium, in particular titanium, and $X^{1B}$ is chlorine, bromine, $C_1$-$C_4$-alkyl or phenyl or two radicals $X^{1B}$ form a substituted or unsubstituted diene ligand, $R^{15B}$ is

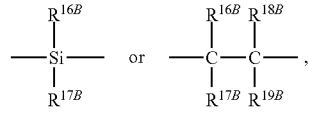

$A^{1B}$ is —O—, —S— or t is 1 or 2, preferably 2, $R^{1B}$ to $R^{3B}$ and $R^{5B}$ are each hydrogen, $C_1$-$C_{10}$-alkyl, 5- to 7-membered cycloalkyl or cycloalkenyl, $C_6$-$C_{40}$-aryl, —$NR^{8B}{}_2$ or —$Si(R^{8B})_3$, where two radicals $R^{1B}$ to $R^{3B}$ and $R^{5B}$ may also be joined to form a five-, six- or seven-membered ring, with particular preference being given to all $R^{1B}$ to $R^{3B}$ and $R^{5B}$ being methyl.

One group of complexes of the formula (IId) which are particularly useful are those in which $M^{1B}$ is titanium, vanadium or chromium, preferably in the oxidation state III, $X^{1B}$ is chlorine, $C_1$-$C_4$-alkyl or phenyl or two radicals $X^{1B}$ form a substituted or unsubstituted butadiene ligand, $R^{15B}$ is

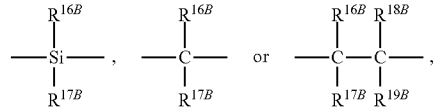

$A^{1B}$ is —$OR^{18B}$, —$NR^{18B}{}_2$, —$PR^{18B}{}_2$ or an unsubstituted, substituted or fused, heterocyclic, in particular heteroaromatic, ring system, v is 1 or when $A^{1B}$ is an unsubstituted, substituted or fused, heterocyclic ring system may be 1 or 0 and $R^{1B}$ to $R^{3B}$ and $R^{5B}$ are each hydrogen, $C_1$-$C_{10}$-alkyl, 5- to 7-membered cycloalkyl or cycloalkenyl, $C_6$-$C_{40}$-aryl or —Si($R^{8B}$)$_3$, where two radicals $R^{1B}$ to $R^{3B}$ and $R^{5B}$ may also be joined to form a five-, six- or seven-membered ring.

In a preferred embodiment of the complexes (IId), $A^{1B}$ is an unsubstituted, substituted or fused, heteroaromatic ring system and $M^{1B}$ is chromium. Very particular preference is given to $A^{1B}$ being an unsubstituted or substituted, e.g. alkyl-substituted, quinolyl, in particular substituted or unsubstituted quinolyl bound in position 8 or 2, and v being 0 or $A^{1B}$ being a substituted or unsubstituted pyridyl bound in position 2 and v being 1.

In a particularly preferred embodiment of the complexes (IId), at least one of the substituents $R^{1B}$ to $R^{3B}$ and $R^{5B}$ is a $C_6$-$C_{40}$-aryl, $A^{1B}$ is a substituted or unsubstituted quinolyl bound in position 8 or 2 and v is 0 or $A^{1B}$ is a substituted or unsubstituted pyridyl bound in position 2 and v is 1 and $M^{1B}$ is chromium.

The preparation of such functional cyclopentadienyl ligands has been known for a long time. Various synthetic routes to these complexes are described, for example, by M. Enders et al. in Chem. Ber. (1996), 129, 459-463, or P. Jutzi and U. Siemeling in J. Organomet. Chem. (1995), 500, 175-185.

The metal complexes, in particular the chromium complexes, can be obtained in a simple manner by reacting the corresponding metal salts, e.g. metal chlorides, with the ligand anion (e.g. using a method analogous to the examples in DE-A-19710615).

Further suitable catalyst components B2) are transition metal complexes which comprise no cyclopentadienyl unit, hereinafter referred to as Cp-free complexes. Suitable Cp-free complexes are complexes of the general formula (III)

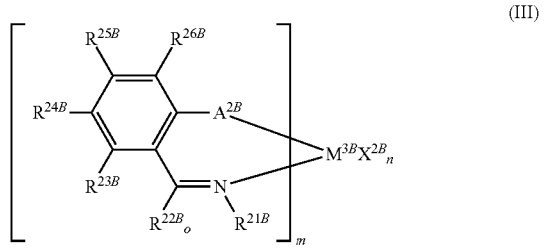

(III)

where $M^{3B}$ is titanium, zirconium or hafnium, $R^{21B}$ to $R^{26B}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{40}$-aryl, arylalkyl having from 1 to 16 carbon atoms in the alkyl radical and from 6 to 20 carbon atoms in the aryl radical or —Si$R^{27B}_3$, where the radicals $R^{21B}$ to $R^{26B}$ may also be substituted by halogens and/or two radicals $R^{21B}$ to $R^{26B}$, in particular vicinal radicals, may also be joined to form a five-, six- or seven-membered ring, and/or two vicinal radicals $R^{1B}$-$R^{6B}$ may be joined to form a five-, six- or seven-membered heterocycle which comprises at least one atom selected from the group consisting of nitrogen, phosphorus, oxygen and sulfur, the radicals $X^{2B}$ are each, independently of one another, fluorine, chlorine, bromine, iodine, hydrogen, $C_1$-$C_{10}$-alkyl, $C_2$-$C_{10}$-alkenyl, $C_6$-$C_{15}$-aryl, arylalkyl having from 1 to 16 carbon atoms in the alkyl radical and from 6 to 20 carbon atoms in the aryl radical, —OR$^{27B}$, —NR$^{27B}$R$^{28B}$, —O—C(O)—R$^{27B}$ or —O—C(O)—NR$^{27B}$R$^{28B}$ and the radicals $X^{2B}$ may, if appropriate, be joined to one another, $A^{2B}$ is —O—, —OR$^{27B}$—, —NR$^{27B}$— or —NR$^{27B}$R$^{28B}$—, m is 1 or 2, n is 1, 2 or 3 and is such that, depending on the valence of $M^{3B}$, the metallocene complex of the general formula (III) is uncharged, o is 1 when NR$^{21B}$ together with the adjacent carbon forms an imine or is 2 when NR$^{21B}$ bears a negative charge, where $R^{27B}$ and $R^{28B}$ are each $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 16 carbon atoms in the alkyl radical and from 6 to 20 carbon atoms in the aryl radical or —Si$R^{29B}$, where the organic radicals $R^{27B}$ and $R^{28B}$ may also be substituted by halogens and/or two radicals $R^{27B}$ and $R^{28B}$ may also be joined to form a five-, six- or seven-membered ring, and the radicals $R^{29B}$ can be identical or different and can each be $C_1$-$C_{10}$-alkyl, 5- to 7-membered cycloalkyl or cycloalkenyl, $C_2$-$C_{22}$-alkenyl, $C_6$-$C_{40}$-aryl, $C_1$-$C_4$-alkoxy or $C_6$-$C_{10}$-aryloxy, where the organic radicals $R^{29B}$ may also be substituted by halogens and/or two radicals $R^{29B}$ may also be joined to form a five-, six- or seven-membered ring.

Preferred transition metal complexes of the general formula (III) are iminophenoxide complexes in which $A^{2B}$ is —O— and o is 1, with the ligands being prepared, for example, from substituted or unsubstituted salicylaldehydes and primary amines, in particular substituted or unsubstituted arylamines. The preparation of such compounds is described, for example, in EP-A 1013674.

Further suitable Cp-free complexes are those of the general formula (IV):

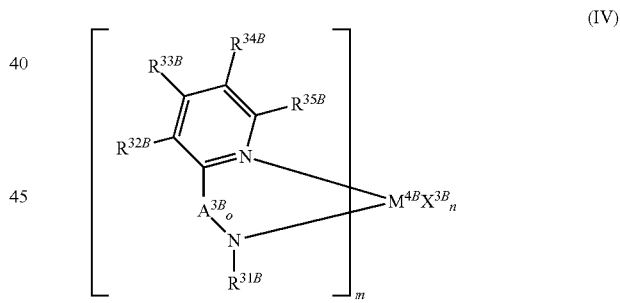

(IV)

where $M^{4B}$ is titanium, zirconium or hafnium, $R^{31B}$ to $R^{35B}$ are each, independently of one another, hydrogen, $C_1$-$C_{22}$-alkyl, 5- to 7-membered cycloalkyl or cycloalkenyl, $C_2$-$C_{22}$-alkenyl, $C_6$-$C_{40}$-aryl, arylalkyl having from 1 to 16 carbon atoms in the alkyl radical and from 6 to 20 carbon atoms in the aryl radical or —Si$R^{38B}_3$, where the organic radicals $R^{31B}$ to $R^{35B}$ may also be substituted by halogens and/or two radicals $R^{31B}$ to $R^{35B}$, in particular adjacent radicals, may also be joined to form a five-, six- or seven-membered ring, and/or two vicinal radicals $R^{31B}$ to $R^{35B}$ may be joined to form a five-, six- or seven-membered heterocycle which comprises at least one atom selected from the group consisting of nitrogen, phosphorus, oxygen and sulfur, the radicals $X^{3B}$ are each, independently of one another, fluorine, chlorine, bromine, iodine, hydrogen, $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 16 carbon atoms in the alkyl radical and from 6 to 20 carbon atoms in the aryl radical, —$OR^{36B}$, —$NR^{36B}R^{37B}$, —O—C(O)—$R^{36B}$ or —O—C(O)—$NR^{38B}R^{37B}$, and the radicals $X^{3B}$ may, if appropriate, be joined to one another, $A^{4B}$ is —$CR^{36B}R^{37B}$— or —$CR^{38BC}$, m is 1 or 2, n is 1, 2 or 3 and is such that, depending on the valence of $M^{4A}$, the complex of the general formula (IV) is uncharged, o is 0 or 1, where $R^{36B}$ and $R^{37B}$ are each $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 16 carbon atoms in the alkyl radical and from 6 to 20 carbon atoms in the aryl radical or —$SiR^{38B}$, where the organic radicals $R^{36B}$ and $R^{37B}$ may also be substituted by halogens and/or two radicals $R^{36B}$ and $R^{37B}$ may also be joined to form a five-, six- or seven-membered ring, and the radicals $R^{38B}$ can be identical or different and can each be $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 16 carbon atoms in the alkyl radical and from 6 to 20 carbon atoms in the aryl radical, $C_1$-$C_4$-alkoxy or $C_6$-$C_{10}$-aryloxy, where the organic radicals $R^{38B}$ may also be substituted by halogens and/or two radicals $R^{38B}$ may also be joined to form a five-, six- or seven-membered ring.

Suitable catalyst components B3) of the Phillips type are preferably prepared by applying a chromium compound to an inorganic support and subsequently calcinating this at temperatures in the range from 350 to 950° C., resulting in chromium present in valences lower than six being converted into the hexavalent state. Apart from chromium, further elements such as Mg, Ca, B, Al, P, Ti, V, Zr and Zn can also be used. Particular preference is given to the use of Ti, Zr or Zn. It may be emphasized that combinations of the abovementioned elements are also possible according to the invention. The catalyst precursor can also be doped with fluoride prior to or during calcination. As supports for Phillips catalysts, which are also known to those skilled in the art, mention may be made of aluminum oxide, silicon dioxide (silica gel), titanium dioxide, zirconium dioxide or their mixed oxides or cogels, or aluminum phosphate. Further suitable support materials can be obtained by modifying the pore surface area, e.g. by means of compounds of the elements boron, aluminum, silicon or phosphorus. Preference is given to using a silica gel. Preference is given to spherical or granular silica gels, with the former also being able to be spray dried. The activated chromium catalysts can subsequently be prepolymerized or prereduced. The prereduction is usually carried out by means of Co or else by means of hydrogen at 250 to 500° C., preferably at 300 to 400° C., in an activator.

According to the present invention, an oligomerization of ethylene is carried out simultaneously to the polymerization in the presence of an oligomerization catalyst component (C). The oligomerization catalyst component (C) forms in the polymerization reactor or in the polymerization reactors under the reaction conditions, under which catalyst components (A) and (B) produce the first and a second polyethylene fraction, 1-olefins by oligomerizing ethylene. A catalyst component acts as oligomerization catalyst component (C) according to the present invention if under the specific reaction conditions of the oligomerization reaction at least 50 wt.-% of the products of the reaction are hydrocarbons with 4 to 30 carbon atoms.

Preferable oligomerization catalyst components (C) produce predominantly one 1-olefin, for examples predominantly 1-hexene or predominantly 1-butene. More preferably the reaction product of the oligomerization is a mixture of different 1-olefins.

Suitable oligomerization catalyst component (C) include late transition metal complexes with nitrogen and/or phosphor containing ligands like nickel and palladium complexes with diimine, pyridylimine, diamine or iminophosphine ligands, chromium complexes with nitrogen containing ligands like pyrrole or triazacyclohexane derivatives or with diphosphinoaminyl, maleimide or di-phosphazane ligands and vanadium complexes with arene ligands. Preferred oligomerization catalyst components (C) are late transition metal compounds comprising a bisiminopyridyl ligand bearing two mono-ortho substituted aryl radicals. Preferred late transition metals are those of groups 8 to 10 of the Periodic Table of Elements and in particular selected from the group consisting of iron nickel, palladium, and cobalt. Particularly preferred are catalyst components (C) based on iron or cobalt.

Especially preferred catalysts components (C) are iron or cobalt complexes of general formula (V)

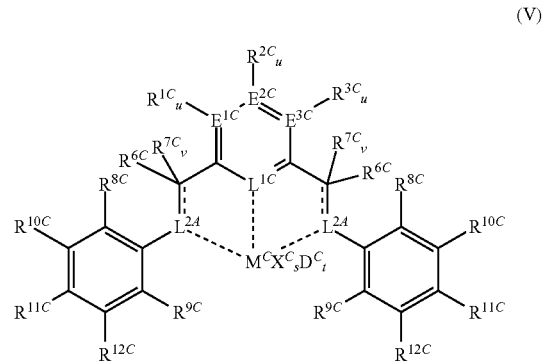

(V)

where the substituents and indices have the above-defined meaning.

$L^{1C}$ and $L^{2C}$ are each, independently of one another, nitrogen or phosphorus, preferably nitrogen, $E^{1C}$ to $E^{3C}$ independently of one another are carbon, nitrogen or phosphorus and preferably carbon, $R^{1C}$ to $R^{3C}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{40}$-aryl, arylalkyl having from 1 to 16 carbon atoms in the alkyl part and 6 to 20 carbon atoms in the aryl part, —$NR^{4C}_2$, —$OR^{4C}$, or —$SiR^{5C}_3$ or a five-, six- or seven-membered heterocycle, which comprises at least one atom from the group consisting of nitrogen, phosphorus, oxygen and sulfur, where the radicals $R^{1C}$ to $R^{3C}$ may also be substituted by halogen, —$NR^{4C}_2$, —$OR^{4C}$, or —$SiR^{5C}_3$ and/or two radicals $R^{1C}$ to $R^{3C}$, in particular adjacent radicals, together with the atoms connecting them may be joined to form a preferably 5-, 6- or 7-membered ring or a preferably 5-, 6- or 7-membered heterocycle which comprises at least one atom selected from the group consisting of nitrogen, phosphorus, oxygen and sulfur, where $R^{4C}$ can be identical or different and can each be hydrogen, $C_1$-$C_{22}$-alkyl, $C_2$-$C_{22}$-alkenyl, $C_6$-$C_{40}$-aryl, arylalkyl having from 1 to 16 carbon atoms in the alkyl part and from 6 to 20 carbon atoms in the aryl part, or —$SiR^{5C}_3$ where the radicals $R^{4C}$ may also be substituted by halogen, and/or two radicals $R^{4C}$ may also be joined to form a 5-, 6- or 7-membered ring, $R^{5C}$ can be identical or different and can each be hydrogen, $C_1$-$C_{22}$-alkyl, $C_2$-$C_{22}$-alkenyl, $C_6$-$C_{40}$-aryl, arylalkyl having from 1 to 16 carbon atoms in the alkyl part and from 6 to 20 carbon atoms in the aryl part and/or two radicals $R^{5C}$ may also be joined to form a 5-, 6- or 7-membered ring, u independently of one another are 0 for $E^{1C}$ to $E^{3C}$ being nitrogen or phosphorus and 1 for $E^{1C}$ to $E^{3C}$ being carbon, $R^{6C}$ and $R^{7C}$ are each, independently of one another, hydrogen, $C_1$-$C_{22}$-alkyl, $C_2$-$C_{22}$-alkenyl, $C_6$-$C_{40}$-aryl, arylalkyl having from 1 to 16 carbon atoms in the alkyl part and 6 to 20 carbon atoms in the aryl part, $-NR^{5C}_2$, or $-SiR^{4C}_3$, where the radicals $R^{6C}$ and $R^{7C}$ may also be substituted by halogen and/or two radicals $R^{6C}$ and $R^{7C}$, may be joined to form a preferably 5-, 6- or 7-membered ring or a preferably 5-, 6- or 7-membered heterocycle which comprises at least one atom selected from the group consisting of nitrogen, phosphorus, oxygen and sulfur, v independently of one another, are 0 or 1, and when v is 0 the bond between $L^{2C}$ and the carbon atom bearing radical $R^{6C}$ is a double bond, $R^{8C}$ are each hydrogen $R^{9C}$ to $R^{12C}$ are each, independently of one another, $C_1$-$C_{20}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and 6-20 carbon atoms in the aryl radical, halogen, $-NR^{13C}_2$, $-OR^{13C}$ or $-SiR^{13C}_3$, where the organic radicals $R^{8C}$ to $R^{12C}$ may also be substituted by halogens and/or two vicinal radicals $R^{8C}$ to $R^{12C}$ may also be joined to form a five-, six- or seven-membered ring, and/or two vicinal radicals $R^{8C}$ to $R^{12C}$ are joined to form a five-, six- or seven-membered heterocycle which comprises at least one atom selected from the group consisting of nitrogen, phosphorus, oxygen and sulfur, or $R^{10C}$ to $R^{12C}$ are, independently of one another, hydrogen, the radicals $R^{13C}$ are each, independently of one another, hydrogen, $C_1$-$C_{20}$-alkyl, $C_2$-$C_{20}$-alkenyl, $C_6$-$C_{40}$-aryl, alkylaryl having from 1 to 10 carbon atoms in the alkyl part and 6-20 carbon atoms in the aryl part, where the organic radicals $R^{13C}$ may also be substituted by halogens or nitrogen- and oxygen-comprising groups and two radicals $R^{13C}$ may also be joined to form a five- or six-membered ring, $M^C$ is iron or cobalt, preferably iron $X^C$ independently of one another are fluorine, chlorine, bromine, iodine, hydrogen, $C_1$-$C_{10}$-alkyl, $C_2$-$C_{10}$-alkenyl, $C_6$-$C_{40}$-aryl, arylalkyl having 1 to 16 carbon atoms in the alkyl part and 6 to 20 carbon atoms in the aryl part, $-NR^{14C}_2$, $-OR^{14C}$, $-SR^{14C}$, $-SO_3R^{14C}$, $-OC(O)R^{14C}$, $-ON$, $-SCN$, $\beta$-diketonate, $-CO$, $BF_4^-$, $PF_6^-$ or bulky non-coordinating anions, wherein the organic radicals $X^C$ can also be substituted by halogens and/or at least one radical $R^{14C}$, and the radicals $X^C$ are optionally bonded with one another, $R^{14C}$ independently of one another are hydrogen, $C_1$-$C_{22}$-alkyl, $C_2$-$C_{22}$-alkenyl, $C_6$-$C_{40}$-aryl, arylalkyl having 1 to 16 carbon atoms in the alkyl part and 6 to 20 carbon atoms in the aryl part, or $SiR^{15C}_3$, wherein the organic radicals $R^{14C}$ can also be substituted by halogens, and/or in each case two radicals $R^{14C}$ can also be bonded with one another to form a five- or six-membered ring, $R^{15C}$ independently of one another are hydrogen, $C_1$-$C_{20}$-alkyl, $C_2$-$C_{20}$-alkenyl, $C_6$-$C_{40}$-aryl, arylalkyl having 1 to 16 carbon atoms in the alkyl part and 6 to 20 carbon atoms in the aryl part, wherein the organic radicals $R^{15C}$ can also be substituted by halogens, and/or in each case two radicals $R^{15C}$ can also be bonded with one another to form a five- or six-membered ring, s is 1, 2, 3 or 4, $D^C$ is an uncharged donor and t is 0 to 4.

In general formula (V), the three atoms $E^{1C}$, $E^{2C}$ and $E^{3C}$ can be identical or different. If one of them is phosphorus, then the other two are preferably each carbon. If one of them is nitrogen, then the other two are each preferably nitrogen or carbon, in particular carbon.

In general formula (V) the respective two radicals $R^{9C}$ to $R^{12C}$ can be the same or different. Preferably both substituents $R^{9C}$ to $R^{12C}$ of formula (V) are the same. Preferably at least one radical of the group consisting of $R^{8C}$, $R^{9C}$ and $R^{11C}$ is fluorine, chlorine, bromine, iodine, $-OR^{13C}$ or $-CF_3$.

Preferred catalysts components (C) of general formula (V) are 2,6-bis[1-(2-chlorophenylimino)ethyl]pyridine iron(II) chloride, 2,6-bis[1-(2-bromophenylimino)ethyl]pyridine iron(II) chloride, 2,6-bis[1-(2-fluorophenylimino)ethyl]pyridine iron(II) chloride, 2,6-bis[1-(2-methylphenylimino) ethyl]pyridine iron(II) chloride or 2,6-bis[1-(2-trifluoromethylphenylimino)ethyl]pyridine iron(II) chloride or the respective dibromides or tribromides.

Catalyst components (A) and (B) and oligomerization catalyst component (C) have sometimes only little polymerization activity and it is therefore common to bring them into contact with one or more activating compounds in order to be able to achieve good polymerization activity. Thus, the catalyst system of the present invention preferably comprises one or more activating compounds, hereinafter also referred to as activators or cocatalysts, as further component (D). Activation of catalyst components (A) and (B) and oligomerization catalyst component (C) can be carried out using the same cocatalyst or cocatalyst mixture or using different cocatalysts. It is often advantageous to use the same component (D) for all catalyst components (A), (B) and (C). Suitable activators for the types of catalyst mentioned are generally known.

The amount of components (D) to be used depends on the type of activator. In general, the molar ratio of the sum of all metals of catalyst components (A), (B) and (C) to activating component (D) can be from 1:0.1 to 1:10 000, preferably from 1:1 to 1:2000.

Preferred components (D) are aluminoxanes. It is possible to use, for example, the compounds described in WO 00/31090. Particularly suitable aluminoxanes are open-chain or cyclic aluminoxane compounds of the general formulae (VI) or (VII)

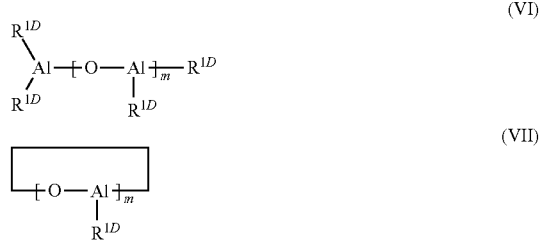

where $R^{1D}$ is each, independently of one another, a $C_1$-$C_6$-alkyl group, preferably a methyl, ethyl, butyl or isobutyl group, and m is an integer from 1 to 40, preferably from 4 to 25.

A particularly suitable aluminoxane compound is methylaluminoxane.

Suitable components (D) are, for example, also strong, uncharged Lewis acids, ionic compounds having Lewis-acid cations or an ionic compounds containing Brönsted acids as cations. Examples are tris(pentafluorophenyl)borane, tetrakis(pentafluorophenyl)borate or salts of N,N-dimethylanilinium.

Further suitable components (D) are metal compounds of general formula (VIII),

$$M^D(R^{2D})_r(R^{3D})_s(R^{4D})_t \qquad (VIII)$$

where $M^D$ is lithium, sodium, potassium, beryllium, magnesium, calcium, strontium, barium, boron, aluminum, gallium, indium, thallium, zinc, preferably lithium, sodium, potassium, magnesium, boron, aluminum or zinc and in particular lithium, magnesium, boron or aluminum, $R^{2D}$ is hydrogen, $C_1$-$C_{10}$-alkyl, $C_6$-$C_{15}$-aryl, alkylaryl or arylalkyl each having from 1 to 16 carbon atoms in the alkyl radical and from 6 to 20 carbon atoms in the aryl radical, preferably $C_1$-$C_{20}$-alkyl $R^{3D}$ and $R^{4D}$ are each hydrogen, halogen, $C_1$-$C_{10}$-alkyl, $C_6$-$C_{15}$-aryl, alkylaryl, arylalkyl or alkoxy each having from 1 to 20 carbon atoms in the alkyl radical and from 6 to 20 carbon atoms in the aryl radical, or alkoxy with $C_1$-$C_{10}$-alkyl or $C_6$-$C_{15}$-aryl, r is an integer from 1 to 3 and s and t are integers from 0 to 2, with the sum r+s+t corresponding to the valence of $M^3$ It is also possible to use mixtures of various metal compounds of the formula (VIII). Particularly preferred metal compounds of the formula (XI) are methyllithium, ethyllithium, n-butyllithium, methylmagnesium chloride, methylmagnesium bromide, ethylmagnesium chloride, ethylmagnesium bromide, butylmagnesium chloride, dimethylmagnesium, diethylmagnesium, dibutylmagnesium, n-butyl-n-octylmagnesium, n-butyl-n-heptylmagnesium, preferably n-butyl-n-octylmagnesium, tri-n-hexylaluminum, triisobutylaluminum, tri-n-butylaluminum, triethylaluminum, dimethylaluminum chloride, dimethylaluminum fluoride, methylaluminum dichloride, methylaluminum sesquichloride, diethylaluminum chloride and trimethylaluminum and mixtures thereof. The partial hydrolysis products of aluminum alkyls with alcohols can also be used.

If a metal compounds of general formula (VIII) is used, it is preferably comprised in the catalyst system in such an amount that the molar ratio of $M^D$ from formula (VIII) to the sum of all metals of catalyst components (A), (B) and (C) is from 3000:1 to 0.1:1, preferably from 800:1 to 0.2:1 and particularly preferably from 100:1 to 1:1.

For carrying out the process of the present invention in gas-phase or in suspension it is often advantageous to use a catalyst system comprising catalyst components (A) and (B) and oligomerization catalyst component (C) in solid form. Accordingly, in a preferred embodiment of the present invention catalyst at least one of components (A) and (B) and oligomerization catalyst component (C) are applied to a solid support.

The catalyst system used in the process of the present invention can comprise one or more support components. Preferably all catalyst components (A), (B), and (C) are supported, however it is also possible that only one or two of them are applied to a support. Catalyst components (A), (B), and (C) can be applied to different supports or together to a common support. The components are preferably applied to a common support in order to ensure relative spatial proximity of the various catalyst sites and thus achieve good mixing of the different polymers formed. Immobilization of catalyst components (A), (B), and (C) on the support can occur by physisorption or by means of a chemical reaction, i.e. covalent bonding of the components, with reactive groups of the support surface.

Suitable support materials are finely divided organic or inorganic materials, such as for example inorganic oxides like silicon dioxide, aluminum oxide or mixed oxides of the elements silicon, aluminum, calcium, magnesium and titanium, and in particular silica or spray-dried silica, or other inorganic materials such as hydrotalcites, aluminosilicates, talc, montmorillonite, mica, magnesium chloride or organic polymers such as polyethylene, polypropylene, polystyrene or polytetrafluoroethylene or polymers having polar functional groups, for example copolymers of ethene and acrylic esters, acrolein or vinyl acetate. Mixtures of support materials can also be used. Preferably the used support material is dried and/or calcinated before use Preferred support materials have a specific surface area in the range of from 10 to 1000 $m^2$/g, preferably from 50 to 800 $m^2$/g and more preferably from 100 to 600 $m^2$/g, a pore volume in the range of from 0.1 to 10 $cm^3$/g, preferably from 0.2 to 5 $cm^3$/g and more preferably from 0.5 to 3.0 $cm^3$/g and a mean particle diameter D50 in the range of from 1 to 500 µm, preferably from 5 to 200 µm and more preferably from 10 to 150 µm. Hereby the specific surface area is determined by gas adsorption using the BET (Brunauer-Emmett-Teller) method according to DIN ISO 9277:2003-05 and the mean particle diameter D50 is determined by laser diffraction according to DIN ISO 13320-1. The pore volume is determined by adding water to the pulverulent substance until all pores are saturated with liquid, which is evident from the powder losing its flowability and starting to form lumps. The volume of water required per gram of sample corresponds to the pore volume of the sample. For measuring 5 g of the material are weighed out into a dry powder bottle (150 ml) with screw cap. Distilled water is added in portions from a burette, the bottle is sealed with the screw cap, and the contents are mixed by vigorous shaking. The bottle is then placed vigorously on a cork mat and subsequently rotated. When about ⅓ of the sample remains stuck to the base of the bottle during this operation, the pores are saturated. The water consumption is read off and converted to 1 g of the sample.

The catalyst components (A), (B), and (C) are preferably applied in such amounts that the concentration of the transition metal of the catalyst component (A) in the finished catalyst solid is from 1 to 80 µmol, preferably from 5 to 70 µmol, per g of support material, the concentration of the transition metal of the catalyst component (B) in the finished catalyst solid is from 1 to 80 µmol, preferably from 5 to 70 µmol, per g of support material, and the concentration of the transition metal of the catalyst component (C) in the finished catalyst solid is from 0.5 to 50 µmol, preferably from 1 to 40 µmol and particularly preferably from 2 to 30 µmol, per g of support material.

To produce catalyst solids suitable for the process of the present invention, the order in which catalyst components (A), (B), and (C) and optionally cocatalyst (D) are combined with the support is in principle immaterial. Catalyst components (A), (B), and (C) and optionally cocatalyst (D) can be applied independently of one another to the support, e.g. in succession or simultaneously. Thus, the support can firstly be brought into contact with the activating compound or compounds (D) or the support can firstly be brought into contact with one or more of catalyst components (A), (B), and (C).

Preactivation of one or more of catalyst components (A), (B), and (C), particularly catalyst component B1), with one or more activating compounds (D) before mixing with the support is also possible.

Catalyst components (A), (B), and (C) and optionally cocatalyst (D) are generally applied to the support in an inert solvent which can be filtered off or evaporated after the immobilization. After the individual process steps, the solid can be washed with suitable inert solvents, e.g. aliphatic or aromatic hydrocarbons, and dried, preferably until a free-flowing powder is obtained. The use of a still moist catalyst solid in the process of the present invention is also possible.

It is also possible for the catalyst system firstly to be pre-polymerized with an α-olefin, preferably with a linear $C_2$-$C_{10}$-1-alkene and in particular ethylene or propylene. The resulting prepolymerized catalyst solid may then be submitted to the actual polymerization step.

Furthermore, a small amount of an olefin, preferably an α-olefin, for example vinylcyclohexane, styrene or phenyldimethylvinylsilane can be added as additive during or after the preparation of the catalyst. Other additives, such as for example wax or oil, can be also added during or after the preparation of the catalyst.

According to the present invention there is carried out in parallel an oligomerization reaction in the presence of oligomerization catalyst component (C) and polymerization reactions in the presence of catalyst components (A) and (B). The reaction products of the polymerization reactions are components of the ethylene copolymer compositions of the process of the present invention. The reaction products of the oligomerization reaction are oligomers, which are predominantly olefins and thereof predominantly olefins with vinyl endgroups, i.e. 1-olefins. At least 70 wt.-% of the products of the reaction are hydrocarbons with 4 to 30 carbon atoms. A suitable method for determining the nature and the amount of obtained hydrocarbons with up to 30 carbon atoms is gas chromatography-mass spectrometry (GC-MS).

The olefins obtained by the oligomerization in the presence of the oligomerization catalyst component (C) act as comonomers in the polymerization reactions in the presence of catalyst components (A) and (B). Accordingly it is possible to obtain polyethylene with densities below 0.96 g/cm$^3$ without adding any monomers different from ethylene. In a preferred embodiment of the present invention the only monomer fed to the polymerization reactor or to the polymerization reactors is ethylene.

The amount of comonomer incorporated into the polymerization product depends on the nature of catalyst components (A) and (B), on their ratio and further on the reaction conditions. An important factor of the reaction conditions is the concentration of the comonomers. Their amount depends in turn on the nature of oligomerization catalyst component (C), on its ratio to the concentration of catalyst components (A) and (B) and the nature of catalyst components (A) and (B), and again on the reaction conditions. Accordingly, there exist a multitude of possibilities to vary and control the composition and thus also the properties of the ethylene copolymer compositions obtained by the process of the present invention even if there is no additional comonomer fed to the polymerization reactor or to the polymerization reactors.

In a preferred embodiment of the present invention at least one comonomer different from ethylene is fed to the polymerization reactor or to the polymerization reactors. Accordingly, not only the olefins obtained by the oligomerization catalyst component (C) but also the at least one additionally fed comonomer are then incorporated into the polymerization product obtained by catalyst components (A) and (B). If additional comonomer is fed the usual amount of additional comonomer is so that from 5% by weight to 90% by weight of the structural units of the ethylene copolymer composition, which result from incorporated comonomer, result from olefin, which was fed to the at least one polymerization reactor. Feeding additional comonomer brings about the advantage that it is easily possible to obtain product with constant product quality. That means, since different batches of a catalyst system have to be used in a continuous process it can happen that the ratio of catalyst components (A) and (B) to oligomerization catalyst component (C) might vary in a certain range. By controlling the product properties and adapting the quantity of additionally fed comonomer it is then easily possible to compensate such variations.

The process of the present invention can be in principle carried out using all industrially known polymerization methods at temperatures in the range from 60° C. to 350° C., preferably from 0° C. to 200° C. and particularly preferably from 25° C. to 150° C., and under pressures of from 0.05 MPa to 400 MPa, preferably from 0.1 MPa to 10 MPa, and particularly preferably from 0.3 MPa to 4 MPa. It can be carried out preferably in solution, in suspension, in the gas phase or in a supercritical medium in conventional reactors used for the polymerization of olefins. The polymerization can be carried out batch-wise or, more preferably, continuously in one or more stages. Solution processes, suspension processes, stirred gas-phase processes, gas-phase fluidized-bed processes or gas-phase processes in a multizone reactor are all possible. Gas-phase fluidized-bed processes are particularly preferred.

The mean residence times are preferably from 0.5 to 5 hours. The advantageous pressure and temperature ranges for carrying out the polymerizations usually depend on the polymerization method.

Molecular weight regulators, for example hydrogen, or customary additives such as antistatic agents may also be used in the polymerization. It is further possible to add modifying agents which have an influence on the polymerization activity of the catalyst components and change the polymerization activity of the different catalyst components differently. By using such modifying agents it is possible to adjust for example the polymerization activities of catalyst components A) and B). Suitable modifying agents can be for example water or carbon dioxide as described in WO 2007/012406.

In the case of suspension polymerizations, for example, the polymerization is usually carried out in a suspension medium, preferably an inert hydrocarbon, more preferably an alkane such as for example hexane, or mixtures of hydrocarbons or else in the monomers themselves. The polymerization temperatures are generally in the range from 0° C. to 115° C., more preferably from 70° C. to 120° C., and the pressure is generally in the range of from 0.1 MPa to 10 MPa. The polymerization can be carried out either batch-wise or continuously, e.g. in stirred tank reactors or in tube reactors, such as for example in loop reactors. The gas-phase polymerization is generally carried out in the range from 30° C. to 125° C. at pressures of from 0.1 MPa to 5 MPa.

The gas-phase polymerization may also be carried out in the condensed or supercondensed mode, in which part of the circulating gas is cooled to below the dew point and is recirculated as a two-phase mixture to the reactor. Furthermore, it is possible to use a multizone reactor in which at least two polymerization zones are inked to one another and the polymer is passed alternately through these polymerization zones a number of times. The polymerization zones can also have different polymerization conditions. Such a reactor is described, for example, in WO 97/04015.

The polymerization processes can also, if desired, be connected in parallel or preferably in series so as to form a polymerization cascade. The polymerization processes can be identical or different, as for example a first reactor could be a gas-phase reactor serially arranged with a second reactor which, for example, may be a multizone reactor.

The process of the present invention makes it possible to prepare polyethylenes with a good combination of polymer properties and processability in which no or at least a reduced amount of comonomer is required and which however provides a good possibility to control the product properties.

The invention is illustrated below with the aid of examples, without being restricted thereto.

EXAMPLES

If not otherwise indicated, all synthesis and polymerizations were carried out in an argon atmosphere. All suspending agents were washed by argon and dried through molecular sieves before being used.

Density was determined according to DIN EN ISO 1183-1:2004, Method A (Immersion) with compression molded plaques of 2 mm thickness. The compression molded plaques were prepared with a defined thermal history: Pressed at 180° C., 20 MPa for 8 min with subsequent crystallization in boiling water for 30 min.

The melt flow rate $MFR_{2.16}$ was determined according to DIN EN ISO 1133:2005, condition D at a temperature of 190° C. under a load of 2.16 kg.

The melt flow rate $MFR_5$ was determined according to DIN EN ISO 1133:2005, condition T at a temperature of 190° C. under a load of 5 kg.

The melt flow rate $MFR_{21.6}$ was determined according to DIN EN ISO 1133:2005, condition G at a temperature of 190° C. under a load of 21.6 kg.

The intrinsic viscosity (IV) was measured at 135° C. by means of an automatic Ubbelohde viscosimeter (Lauda PVS 1) with decaline as solvent, in accordance with standard ISO 1628-3:2003

The content of branches as ethyl-, vinyl-, vinyliden- and total $CH_3$-groups, each per 1000 carbon atoms, was determined by means of $^{13}$C-NMR spectroscopy. The $^{13}$C-NMR spectra were acquired on a Bruker DPX-400 spectrometer operating at 100.61 MHz in the Fourier transform mode at 120° C. The peak $S_{\delta\delta}$ [C. J. Carman, R. A. Harrington and C. E. Wilkes, Macromolecules, 10, 3, 536 (1977)]carbon was used as internal reference at 29.9 ppm. The samples were dissolved in 1,1,2,2-tetrachloroethane-d2 at 120° C. in an amount to end in an 8 wt.-% solution. Each spectrum was acquired with a 90° pulse, 15 seconds of delay between pulses and CPD (WALTZ 16) to remove $^1H$-$^{13}C$ coupling. About 1500-2000 transients were stored in 32K data points using a spectral window of 6000 or 9000 Hz. The assignments of the spectra were made referring to M. Kakugo, Y. Naito, K. Mizunuma and T. Miyatake, Macromolecules, 15, 4, 1150, (1982) and J. C. Randal, Macromol. Chem Phys., C29, 201 (1989).

The determination of the weight average molecular weight $M_w$ and the number average molecular weight $M_n$ were carried out by high-temperature gel permeation chromatography using a method described in ISO 16014-1:2003(E) and ISO 16014-4:2003(E): solvent 1,2,4-trichlorobenzene (TCB), temperature of apparatus and solutions 135° C. and as concentration detector a Polymer-Char (Valencia, Paterna 46980, Spain) IR-4 infrared detector, capable for use with TCB. A WATERS Alliance 2000 equipped with the following precolumn SHODEX UT-G and separation columns SHODEX UT 806 M (3×) and SHODEX UT 807 connected in series was used. The solvent was vacuum distilled under nitrogen and was stabilized with 0.025 wt.-% of 2,6-di-tert-butyl-4-methylphenol. The flow rate used was 1 mL/min, the injection was 400 μL and polymer concentration was in the range of 0.01%<conc.<0.05% w/w. The molecular weight calibration was established by using monodisperse polystyrene (PS) standards from Polymer Laboratories (now Varian, Inc., Essex Road, Church Stretton, Shropshire, SY6 6AX, UK) in the range from 580 g/mol up to 11600000 g/mol and additionally hexadecane. The calibration curve was then adapted to polyethylene (PE) by means of the Universal Calibration method according to ISO 16014-2:2003(E). The Mark-Houwing parameters used were for PS: $k_{PS}$=0.000121 dL/g, $\alpha_{PS}$=0.706 and for PE $k_{PE}$=0.000406 dL/g, $\alpha_{PE}$=0.725, valid in TCB at 135° C. Data recording, calibration and calculation was carried out using NTGPC_Control_V6.3.00 and NTG-PC_V6.4.05 (hs GmbH, Hauptstrafle 36, D-554370-ber-Hilbersheim), respectively.

Dart drop impact was determined according to standard ASTM D1709, Method A on film samples having a thickness of 30 μm prepared by means of a blown film process in which the film is extruded according to the long-stalk process. The Elmendorf tear resistance in machine direction (MD) and in transverse direction (TD) was determined on identical film samples by the tear propagation test performed according to ISO 6383-2:1983.

Example 1

Preparation of 2,6-bis[1-(2-chloro-4,6-dimethylphenylimino)ethyl]pyridine iron(II) dichloride 35.0 g 2,6-diacetylpyridine (0.215 mol), 50 g of Sicapent® (phosphorus pentoxide drying agent) obtained from Merck KGaA, Darmstadt, Germany and 76.8 g (0.493 mol) 2-chloro-4,6-dimethylaniline were dissolved in 1500 mL of THF. The mixture was heated under reflux conditions for 42 hours. The mixture was subsequently filtered at room temperature. The filter cake was washed with 50 mL of THF. The solvent of the combined filtrates was distilled off. 250 mL of methanol were added and the mixture was stirred for 1 hour. A yellow suspension was formed in this way. The solid product was isolated by filtration, twice washed with 20 mL of methanol and subsequently dried. Yield: 58.0 g (61.7%) of 2,6-bis[1-(2-chloro-4,6-dimethylphenylimino)ethyl]pyridine.

10 g of 2,6-bis[1-(2-chloro-4,6-dimethylphenylimino)ethyl]pyridine (22.81 mmol) were dissolved in 100 mL of THF. 3.86 g of $FeCl_2*4H_2O$ (19.4 mmol) were added and the mixture was stirred for 4 h at room temperature. A blue precipitate formed. The solid product was isolated by filtration at room temperature, washed with 100 mL of pentane and subsequently dried. Yield: 13.66 g (94%) of 2,6-bis[1-(2-chloro-4,6-dimethylphenylimino)ethyl]pyridine iron(II) dichloride.

Example 2

Preparation of 2,6-bis[1-(2-chloro-phenylimino)ethyl]pyridine iron(II) dichloride 1.0 g (0.0061 mol) of 2,6-diacetylpyridine and 1.95 g (0.0153 mol) of 2-chloroaniline were dissolved in 20 mL of toluene. 0.5 g Silica-alumina catalyst support, grade 135, from Sigma-Aldrich Chemie GmbH, Steinheim, Germany and 1 g molecular sieve (4 Å) were added and the mixture was stirred for 18 h at room temperature. Subsequently a further 0.5 g silica-alumina catalyst support, grade 135 and 1 g molecular sieve (4 Å) were added and the mixture was stirred for 47 h at room temperature. The mixture was subsequently filtered at room temperature and washed with 5 mL of toluene. The solvent of the filtrate was distilled off. 3 mL of methanol were added and crystals appeared. The product was isolated by filtration and washed with 20 mL of methanol and subsequently dried. Yield: 0.43 g (18.4%) of 2,6-bis[1-(2-chlorophenylimino)ethyl]pyridine 87.2 g of 2,6-bis[1-(2-chlorophenylimino)ethyl]pyridine (228.09 mmol) were dissolved in 1.3 l of THF. 43.08 g of $FeCl_2*4H_2O$ (216.69 mmol) were added and the mixture was stirred for 4 h at room temperature. A blue precipitate formed. The solid product was isolated by filtration at room temperature, washed with of 100 mL of pentane and subsequently dried. Yield: 90.62 g (68.4%) of 2,6-bis[1-(2-chlorophenylimino)ethyl]pyridine iron(II) dichloride

Example 3

Preparation of Supported Catalyst System 2.5 kg of spray-dried silica Sylopol® XPO2326 obtained from Grace GmbH & Co. KG, Worms, Germany were calcinated at 600° C. for 6 hours and then stored at 10° C. 910.8 mg of 2,6-bis[1-(2-chloro-4,6-dimethylphenylimino)ethyl]pyridine iron(II) dichloride obtained in Example 1 as catalyst component (A), 8.68 g of a 25 wt-% solution of bis(1-methyl-3-n-butylcyclopentadienyl)zirconium dichloride in toluene obtained from Albemarle Deutschland GmbH, Bergheim, Germany as catalyst component (B) and 96.5 mg of 2,6-bis[1-(2-chlorophenylimino)-ethyl]pyridine iron(II) dichloride obtained in Example 2 as oligomerization catalyst component (C) were dissolved in a mixture of 30.5 mL of toluene and of 122.7 mL of a 30% wt.-% solution of MAO in toluene obtained from Chemtura Organometallics GmbH, Bergkamen, Germany. The solution was added to 94.8 g of the pre-treated spray-dried silica at 0° C. A wet powder, not free-flowing, was obtained. Afterward the catalyst was stirred for two hours at 10° C. Thereafter, the catalyst was suspended in 400 mL of heptane. The suspension was filtered over an argon overlaid frit and the obtained solid was dried under argon flow. 202 g of a powder of light ivory color were obtained.

The theoretical loading was 17 μmol of catalyst component (A)/g of silica, 53 μmol of catalyst component (B)/g of silica and 2 μmol of oligomerization catalyst component (C)/g of silica and the theoretical molar ratio of Al:Σ(Fe+Zr) was 85:1.

Example 4

Preparation of Supported Catalyst System

Example 3 was repeated under identical conditions, however using 894 mg of the 2,6-bis[1-(2-chloro-4,6-dimethylphenylimino)ethyl]pyridine iron(II) dichloride obtained in Example 1, 10.36 g of the 25 wt-% solution of bis(1-methyl-3-n-butylcyclopentadienyl)zirconium dichloride in toluene, 213 mg of the 2,6-bis[1-(2-chlorophenylimino)-ethyl]pyridine iron(II) dichloride obtained in Example 2, 153 mL of the 30% wt.-% solution of MAO in toluene, 4 mL of toluene and 105.4 g of the pre-treated spray-dried silica. 210 g of a powder of ivory color were obtained.

The theoretical loading was 15 μmol of catalyst component (A)/g of silica, 57 μmol of catalyst component (B)/g of silica and 4 μmol of oligomerization catalyst component (C)/g of silica and the theoretical molar ratio of Al:Σ(Fe+Zr) was 90:1.

Example 5

Preparation of Supported Catalyst System

Example 3 was repeated under identical conditions, however using 1.27 g of the 2,6-bis[1-(2-chloro-4,6-dimethylphenylimino)ethyl]pyridine iron(II) dichloride obtained in Example 1, 12.88 g of the 25 wt-% solution of bis(1-methyl-3-n-butylcyclopentadienyl)zirconium dichloride in toluene, 134 mg of the 2,6-bis[1-(2-chlorophenylimino)ethyl]pyridine iron(II) dichloride obtained in Example 2, 196 mL of the 30% wt-% solution of MAO in toluene, 26 mL of toluene and 132.1 g of the pre-treated spray-dried silica. 261 g of a powder of ivory color were obtained.

The theoretical loading was 17 μmol of catalyst component (A)/g of silica, 57 μmol of catalyst component (B)/g of silica and 2 μmol of oligomerization catalyst component (C)/g of silica and the theoretical molar ratio of Al:Σ(Fe+Zr) was 90:1.

Comparative Example A

Preparation of Supported Catalyst System

Example 3 was repeated under identical conditions, however using 46.6 g of the 2,6-bis[1-(2-chloro-4,6-dimethylphenylimino)ethyl]pyridine iron(II) dichloride obtained in a way as described in Example 1, 186.4 g of the 25 wt-% solution of bis(1-methyl-3-n-butylcyclopentadienyl)zirconium dichloride in toluene, 5.783 kg of the 30% wt-% solution of MAO in toluene, 1867 mL of toluene and 5000 g of the pre-treated spray-dried silica without using any 2,6-bis[1-(2-chlorophenylimino)-ethyl]pyridine iron(II) dichloride. 8.5 kg of a powder of light ivory color were obtained.

The theoretical loading was 17 μmol of catalyst component (A)/g of silica and 53 μmol of catalyst component (B)/g of silica and the theoretical molar ratio of Al:Σ(Fe+Zr) was 85:1.

Example 6

Polymerization in Fluidized Bed Reactor

The polymerization was carried out in a stainless steel fluidized bed reactor having an internal diameter of 200 mm equipped with a gas circulation system, cyclone, heat exchanger, control systems for temperature and pressure and feeding lines for ethylene, 1-hexene, nitrogen, hexane and hydrogen. The gas phase reactor was first purified by flushing with nitrogen at 120° C. for 12 hours. The reactor temperature was then set to 92° C., the pressure raised to 2.5 MPa and feed of ethylene and 1-hexene in a ratio of 0.07 g of 1-hexene per g of ethylene was started. The catalyst obtained in example 3 was injected in a discontinuous way by means of dosing valve with nitrogen at a rate of 0.8 g/h into the reactor. Further 0.25 g/h triisobutylaluminum, 12 ppm Costelan AS 100 obtained from H. Costenoble GmbH & Co. KG, Eschborn, Germany and 12 ppm Atmer 163 obtained from of Croda GmbH, Nettetal, Germany were metered into the reactor, where the amount of added Costelan AS 100 or Atmer 163 is specified as weight ratio to the produced polyethylene.

When reaching steady state in the reactor, the reactor was discharging 5 kg/h of polyethylene. The hold-up in the reactor was controlled to be 15 kg, giving a mean residence time of 3 hours in the reactor. The discharged polymer was dried in a continuous way by flushing with nitrogen.

The steady state gas composition in the reactor and the properties of the obtained ethylene copolymer composition are reported in Table 1.

Example 7

Polymerization in Fluidized Bed Reactor

Example 6 was repeated however using the catalyst obtained in example 4 and feeding ethylene and 1-hexene in a ratio of 0.08 g of 1-hexene per g of ethylene.

The steady state gas composition in the reactor and the properties of the obtained ethylene copolymer composition are reported in Table 1.

Comparative Example B

Polymerization in Fluidized Bed Reactor

Example 6 was repeated however polymerizing at 94° C. and using the catalyst obtained in Comparative Example A and injecting it at a rate of 1.0 g/h into the reactor. Ethylene and 1-hexene were fed in a ratio of 0.08 g of 1-hexene per g of ethylene.

The steady state gas composition in the reactor and the properties of the obtained ethylene copolymer composition are reported in Table 1.

TABLE 1

|  | Example 6 | Example 7 | Comparative Example B |
|---|---|---|---|
| $H_2$ [% by volume] | 0 | 0 | 0 |
| Ethylene [% by volume] | 53.1 | 58.2 | 55.2 |
| 1-Butene [% by volume] | 1.1 | 0.35 | 0 |
| 1-Hexene [% by volume] | 1.8 | 1.5 | 1.5 |
| $N_2$ [% by volume] | 42.7 | 37 | 40.5 |
| Hexane [% by volume] | 3.0 | 1.8 | 4.2 |
| Catalyst feed [g/h] | 1.4 | 0.8 | 1.3 |
| 1-Hexene/Ethylene Feed Ratio [g/g] | 0.07 | 0.08 | 0.08 |
| Productivity [g of PE/g of cat.] | 3270 | 4560 | 4080 |
| Density [g/cm$^3$] | 0.9310 | 0.9304 | 0.9328 |
| IV [dl/g] | 1.57 | 1.79 | 1.84 |
| Trans-groups [$^1/_{1000}$ C.] | 0.11 | 0.15 | 0.09 |
| Ethyl groups [$^1/_{1000}$ C.] | 0.8 | 1.2 | — |
| Butyl groups [$^1/_{1000}$ C.] | 4.7 | 5.6 | 5.1 |
| Vinyl groups [$^1/_{1000}$ C.] | 1.22 | 0.97 | 0.56 |
| Vinyliden groups [$^1/_{1000}$ C.] | 0.26 | 0.3 | 0.23 |
| total $CH_3$-groups [$^1/_{1000}$ C.] | 12.1 | 12.2 | 10.5 |
| $M_w/M_n$ | 9.0 | 11.9 | 7.4 |
| $MFR_{2.16}$ [g/10 min] | 3.4 | 1.6 | 1.1 |
| $MFR_5$ [g/10 min] | 10.2 | 4.8 | 3.0 |
| $MFR_{21.6}$ [g/10 min] | 121 | 48 | 23 |
| DDI [g] | 406 | 423 | 326 |
| Elmendorf - MD [g/layer] | 414 | 493 | 453 |
| Elmendorf - TD [g/layer] | 592 | 1192 | 707 |

The comparison between Examples 6 and 7 and Comparative Example B shows that by using a catalyst system comprising catalyst components (A) and (B) and oligomerization catalyst component (C) the resulting ethylene copolymer composition has similar or improved mechanical properties compared to the ethylene-1-hexene copolymer obtained in Comparative Example B.

Example 8

Polymerization in Autoclave

A 1.7-L-steel autoclave was filled under argon at 70° C. with 100 g of polyethylene powder having a particle size of >1 mm, which polyethylene powder was previously dried for 8 hours at 80° C. in vacuum and thereafter stored under argon atmosphere. 2.5 mL of a 50 mg/mL solution of triisobutylaluminum in heptane, 1 mL of a 50 mg/mL solution of Costelan AS 100 obtained from H. Costenoble GmbH & Co. KG, Eschborn, Germany in heptane and 6.5 mL heptane were added. After 5 minutes of stirring, 168 mg of the catalyst solid obtained in Example 5 were added and the catalyst dosing unit was rinsed with 2 mL of heptane. The pressure was increased to 1 MPa at 70° C. by adding nitrogen, thereafter ethylene were fed in until a pressure of 2 MPa was reached. The pressure of 2 MPa at 70° C. was kept constant during the polymerization for 1 hour by further adding ethylene. Thereafter the pressure was released, the polymer was taken out of the autoclave and sieved in order to remove the polymer bed. 195 g of an ethylene copolymer composition were obtained with a productivity of 1161 g of PE/g of catalyst solid. The properties of the polymerization are reported in Table 2.

Example 9

Polymerization in Autoclave

Example 8 was repeated however using 179 mg of the catalyst solid obtained in Example 5 and, after the pressure had been increased to 1 MPa by adding nitrogen, feeding instead of ethylene alone ethylene and 1-hexene at a constant ratio of 0.1 mL 1-hexene/g ethylene until a pressure of 2 MPa was reached. The pressure of 2 MPa was then kept constant by further adding ethylene and hexene in the ratio of 0.1 mL 1-hexene/g ethylene. The totally fed amount of 1-hexene was 25 mL. 246 g of an ethylene copolymer composition were obtained with a productivity of 1374 g of PE/g of catalyst solid. The properties of the polymerization are reported in Table 2.

TABLE 2

|  | Example 8 | Example 9 |
|---|---|---|
| Density [g/cm$^3$] | 0.9386 | 0.9287 |
| IV [dl/g] | 1.85 | 2.1 |
| Ethyl groups [$^1/_{1000}$ C.] | 0.94 | 0.71 |
| Butyl groups [$^1/_{1000}$ C.] | 1.9 | 4.0 |
| Vinyl groups [$^1/_{1000}$ C.] | 0.9 | 0.8 |

The comparison between Example 8 and Example 9 shows that by adding additional 1-olefin to a catalyst system according to the present invention it is possible to have under otherwise identical reaction conditions more comonomer incorporated into the ethylene copolymer composition and consequently to achieve a lower density of the ethylene copolymer composition.

We claim:

1. A process for the preparation of an ethylene copolymer composition having a polydispersity index $M_w/M_n$ of from 3 to 100, comprising:
   a) feeding ethylene to at least one polymerization reactor;
   b) performing in the at least one polymerization reactor an oligomerization of ethylene in the presence of an oligomerization catalyst component (C) to produce a comonomer;
   c) performing simultaneously in the at least one polymerization reactor polymerization reactions in the presence of catalyst components (A) and (B) producing, respectively, a first and a second polyethylene fraction, wherein the weight average molecular weight $M_w$ of the first polyethylene fraction produced by catalyst component (A) is less than the $M_w$ of the second polyethylene fraction produced by catalyst component (B) and the comonomer incorporation ability of catalyst component (B) is higher than the comonomer incorporation ability of catalyst component (A); and d) withdrawing the ethylene copolymer composition from the polymerization reactor, wherein catalyst component (A) is an iron or cobalt complex of general formula (I):

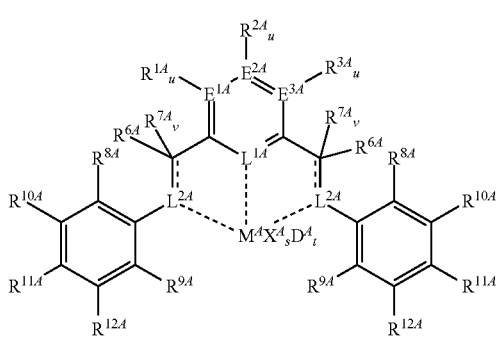

(I)

wherein $L^{1A}$ and $L^{2A}$ are each, independently of one another, nitrogen or phosphorus, $E^{1A}$ to $E^{3A}$ independently of one another are carbon, nitrogen or phosphorus, $R^{1A}$ to $R^{3A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{40}$-aryl, arylalkyl having from 1 to 16 carbon atoms in the alkyl part and 6 to 20 carbon atoms in the aryl part, $-NR^{4A}{}_2$, $-OR^{4A}$, or $-SiR^{5A}{}_3$ or a five-, six- or seven-membered heterocycle, which comprises at least one atom from the group consisting of nitrogen, phosphorus, oxygen and sulfur, where the radicals $R^{1A}$ to $R^{3A}$ may also be substituted by halogen, $-NR^{4A}{}_2$, $-OR^{4A}$, or $-SiR^{5A}{}_3$ and/or two radicals $R^{1A}$ to $R^{3A}$, together with the atoms connecting them may be joined to form a ring or a heterocycle which comprises at least one atom selected from the group consisting of nitrogen, phosphorus, oxygen and sulfur, where $R^{4A}$ can be identical or different and can each be hydrogen, $C_1$-$C_{22}$-alkyl, $C_2$-$C_{22}$-alkenyl, $C_6$-$C_{40}$-aryl, arylalkyl having from 1 to 16 carbon atoms in the alkyl part and from 6 to 20 carbon atoms in the aryl part, or $-SiR^{5A}{}_3$ where the radicals $R^{4A}$ may be substituted by halogen, and/or two radicals $R^{4A}$ may be joined to form a 5-, 6- or 7-membered ring, $R^{5A}$ can be identical or different and can each be hydrogen, $C_1$-$C_{22}$-alkyl, $C_2$-$C_{22}$-alkenyl, $C_6$-$C_{40}$-aryl, arylalkyl having from 1 to 16 carbon atoms in the alkyl part and from 6 to 20 carbon atoms in the aryl part and/or two radicals $R^{5A}$ may be joined to form a 5-, 6- or 7-membered ring, u independently of one another are 0 for $E^{1A}$ to $E^{3A}$ being nitrogen or phosphorus and 1 for $E^{1A}$ to $E^{3A}$ being carbon, $R^{6A}$ and $R^{7A}$ are each, independently of one another, hydrogen, $C_1$-$C_{22}$-alkyl, $C_2$-$C_{22}$-alkenyl, $C_6$-$C_{40}$-aryl, arylalkyl having from 1 to 16 carbon atoms in the alkyl part and 6 to 20 carbon atoms in the aryl part, $-NR^{5A}{}_2$, or $-SiR^{4A}{}_3$, where the radicals $R^{6A}$ and $R^{7A}$ may be substituted by halogen and/or two radicals $R^{6A}$ and $R^{7A}$, may be joined to form a ring or a heterocycle which comprises at least one atom selected from the group consisting of nitrogen, phosphorus, oxygen and sulfur, v independently of one another, are 0 or 1, and when v is 0 the bond between $L^{2A}$ and the carbon atom bearing radical $R^{6A}$ is a double bond, $R^{8A}$ is, halogen, $-NR^{13A}{}_2$, $-OR^{13A}$ or $-SiR^{13A}{}_3$, $R^{9A}$ to $R^{12A}$ are each, independently of one another, $C_1$-$C_{20}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and 6-20 carbon atoms in the aryl radical, halogen, $-NR^{13A}{}_2$, $-OR^{13A}$ or $-SiR^{13A}{}_3$, where the organic radicals $R^{8A}$ to $R^{12A}$ may be substituted by halogens and/or two vicinal radicals $R^{8A}$ to $R^{12A}$ may be joined to form a five-, six- or seven-membered ring, and/or two vicinal radicals $R^{8A}$ to $R^{12A}$ are joined to form a five-, six- or seven-membered heterocycle which comprises at least one atom selected from the group consisting of nitrogen, phosphorus, oxygen and sulfur, or $R^{10A}$ to $R^{12A}$ are, independently of one another, hydrogen, the radicals $R^{13A}$ are each, independently of one another, hydrogen, $C_1$-$C_{20}$-alkyl, $C_2$-$C_{20}$-alkenyl, $C_6$-$C_{40}$-aryl, alkylaryl having from 1 to 10 carbon atoms in the alkyl part and 6-20 carbon atoms in the aryl part, where the organic radicals $R^{13A}$ may be substituted by halogens or nitrogen- and oxygen-comprising groups and two radicals $R^{13A}$ may be joined to form a five- or six-membered ring, $M^A$ is iron or cobalt, $X^A$ independently of one another are fluorine, chlorine, bromine, iodine, hydrogen, $C_1$-$C_{10}$-alkyl, $C_2$-$C_{10}$-alkenyl, $C_6$-$C_{40}$-aryl, arylalkyl having 1 to 16 carbon atoms in the alkyl part and 6 to 20 carbon atoms in the aryl part, $-NR^{14A}{}_2$, $-OR^{14A}$, $-SR^{14A}$, $-SO_3R^{14A}$, $-OC(O)R^{14A}$, $-CN$, $-SCN$, β-diketonate, $-CO$, $BF_4^-$, $PF_6^-$ or bulky non-coordinating anions, wherein the organic radicals $X^A$ can be substituted by halogens and/or at least one radical $R^{14A}$, and the radicals $X^A$ are optionally bonded with one another, $R^{14A}$ independently of one another are hydrogen, $C_1$-$C_{22}$-alkyl, $C_2$-$C_{22}$-alkenyl, $C_6$-$C_{40}$-aryl, arylalkyl having 1 to 16 carbon atoms in the alkyl part and 6 to 20 carbon atoms in the aryl part, or $SiR^{15A}{}_3$, wherein the organic radicals $R^{14A}$ can be substituted by halogens, and/or in each case two radicals $R^{14A}$ can be bonded with one another to form a five- or six-membered ring, $R^{15A}$ independently of one another are hydrogen, $C_1$-$C_{20}$-alkyl, $C_2$-$C_{20}$-alkenyl, $C_6$-$C_{40}$-aryl, arylalkyl having 1 to 16 carbon atoms in the alkyl part and 6 to 20 carbon atoms in the aryl part, wherein the organic radicals $R^{15A}$ can be substituted by halogens, and/or in each case two radicals $R^{15A}$ can be bonded with one another to form a five- or six-membered ring, s is 1, 2, 3 or 4, $D^A$ is an uncharged donor, and t is 0 to 4, and at least one radical of the group consisting of $R^{8A}$, $R^{9A}$ and $R^{11A}$ is fluorine, chlorine, bromine, iodine, $-OR^{13A}$ or $-CF_3$, and catalyst component (C) is an iron or cobalt complex of general formula (V):

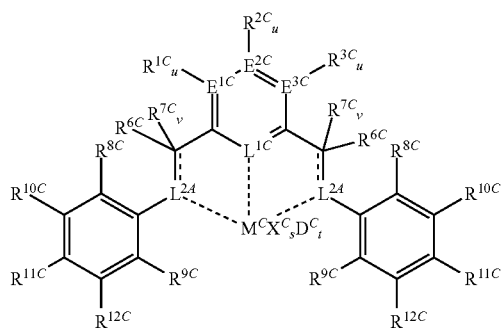

(V)

wherein $L^{1C}$ and $L^{2C}$ are each, independently of one another, nitrogen or phosphorus, $E^{1C}$ to $E^{3C}$ independently of one another are carbon, nitrogen or phosphorus, $R^{1C}$ to $R^{3C}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{40}$-aryl, arylalkyl having from 1 to 16 carbon atoms in the alkyl part and 6 to 20 carbon atoms in the aryl part, —$NR^{4C}_2$, —$OR^{4C}$, or —$SiR^{5C}_3$ or a five-, six- or seven-membered heterocycle, which comprises at least one atom from the group consisting of nitrogen, phosphorus, oxygen and sulfur, where the radicals $R^{1C}$ to $R^{3C}$ may also be substituted by halogen, —$NR^{4C}_2$, —$OR^{4C}$, or —$SiR^{5C}_3$ and/or two radicals $R^{1C}$ to $R^{3C}$, together with the atoms connecting them may be joined to form a ring or a heterocycle which comprises at least one atom selected from the group consisting of nitrogen, phosphorus, oxygen and sulfur, where $R^{4C}$ can be identical or different and can each be hydrogen, $C_1$-$C_{22}$-alkyl, $C_2$-$C_{22}$-alkenyl, $C_6$-$C_{40}$-aryl, arylalkyl having from 1 to 16 carbon atoms in the alkyl part and from 6 to 20 carbon atoms in the aryl part, or —$SiR^{5C}_3$ where the radicals $R^{4C}$ may be substituted by halogen, and/or two radicals $R^{4C}$ may be joined to form a 5-, 6- or 7-membered ring, $R^{5C}$ can be identical or different and can each be hydrogen, $C_1$-$C_{22}$-alkyl, $C_2$-$C_{22}$-alkenyl, $C_6$-$C_{40}$-aryl, arylalkyl having from 1 to 16 carbon atoms in the alkyl part and from 6 to 20 carbon atoms in the aryl part and/or two radicals $R^{5C}$ may be joined to form a 5-, 6- or 7-membered ring, u independently of one another are 0 for $E^{1C}$ to $E^{3C}$ being nitrogen or phosphorus and 1 for $E^{1C}$ to $E^{3C}$ being carbon, $R^{6C}$ and $R^{7C}$ are each, independently of one another, hydrogen, $C_1$-$C_{22}$-alkyl, $C_2$-$C_{22}$-alkenyl, $C_6$-$C_{40}$-aryl, arylalkyl having from 1 to 16 carbon atoms in the alkyl part and 6 to 20 carbon atoms in the aryl part, —$NR^{5C}_2$, or —$SiR^{4C}_3$, where the radicals $R^{6C}$ and $R^{7C}$ may be substituted by halogen and/or two radicals $R^{6C}$ and $R^{7C}$ may be joined to form a ring or a heterocycle which comprises at least one atom selected from the group consisting of nitrogen, phosphorus, oxygen and sulfur, v independently of one another, are 0 or 1, and when v is 0 the bond between $L^{2C}$ and the carbon atom bearing radical $R^{6C}$ is a double bond, $R^{8C}$ are each hydrogen, $R^{9C}$ to $R^{12C}$ are each, independently of one another, $C_1$-$C_{20}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and 6-20 carbon atoms in the aryl radical, halogen, —$NR^{13C}_2$, —$OR^{13C}$ or —$SiR^{13C}_3$, where the organic radicals $R^{8C}$ to $R^{12C}$ may be substituted by halogens and/or two vicinal radicals $R^{8C}$ to $R^{12C}$ may be joined to form a five-, six- or seven-membered ring, and/or two vicinal radicals $R^{8C}$ to $R^{12C}$ are joined to form a five-, six- or seven-membered heterocycle which comprises at least one atom selected from the group consisting of nitrogen, phosphorus, oxygen and sulfur, or $R^{10C}$ to $R^{12C}$ are, independently of one another, hydrogen, the radicals $R^{13C}$ are each, independently of one another, hydrogen, $C_1$-$C_{20}$-alkyl, $C_2$-$C_{20}$-alkenyl, $C_6$-$C_{40}$-aryl, alkylaryl having from 1 to 10 carbon atoms in the alkyl part and 6-20 carbon atoms in the aryl part, where the organic radicals $R^{13C}$ may be substituted by halogens or nitrogen- and oxygen-comprising groups and two radicals $R^{13C}$ may be joined to form a five- or six-membered ring, $M^C$ is iron or cobalt, $X^C$ independently of one another are fluorine, chlorine, bromine, iodine, hydrogen, $C_1$-$C_{10}$-alkyl, $C_2$-$C_{10}$-alkenyl, $C_6$-$C_{40}$-aryl, arylalkyl having 1 to 16 carbon atoms in the alkyl part and 6 to 20 carbon atoms in the aryl part, —$NR^{14C}_2$, —$OR^{14C}$, —$SR^{14C}$, —$SO_3R^{14C}$, —$OC(O)R^{14C}$, —CN, —SCN, β-diketonate, —CO, $BF_4^-$, $PF_6^-$ or bulky non-coordinating anions, wherein the organic radicals $X^C$ can be substituted by halogens and/or at least one radical $R^{14C}$, and the radicals $X^C$ are optionally bonded with one another, $R^{14C}$ independently of one another are hydrogen, $C_1$-$C_{22}$-alkyl, $C_2$-$C_{22}$-alkenyl, $C_6$-$C_{40}$-aryl, arylalkyl having 1 to 16 carbon atoms in the alkyl part and 6 to 20 carbon atoms in the aryl part, or $SiR^{15C}_3$, wherein the organic radicals $R^{14C}$ can be substituted by halogens, and/or in each case two radicals $R^{14C}$ can be bonded with one another to form a five- or six-membered ring, $R^{15C}$ independently of one another are hydrogen, $C_1$-$C_{20}$-alkyl, $C_2$-$C_{20}$-alkenyl, $C_6$-$C_{40}$-aryl, arylalkyl having 1 to 16 carbon atoms in the alkyl part and 6 to 20 carbon atoms in the aryl part, wherein the organic radicals $R^{15C}$ can be substituted by halogens, and/or in each case two radicals $R^{15C}$ can be bonded with one another to form a five- or six-membered ring, s is 1, 2, 3 or 4, $D^C$ is an uncharged donor, and t is 0 to 4, wherein at least one olefin is fed to the at least one polymerization reactor as an additional comonomer beside ethylene and from 5% by weight to 90% by weight of the structural units of the ethylene copolymer composition, which results from the incorporated comonomer, result from olefin, which was fed to the at least one polymerization reactor, and from 10% by weight to 95% by weight of the structural units of the ethylene copolymer composition, which results from the incorporated comonomer, result from comonomer, which was obtained by oligomerization of ethylene according to step b).

2. The process for the preparation of the ethylene copolymer composition according to claim 1, wherein a density of the ethylene copolymer composition is from 0.86 g/cm³ to 0.955 g/cm³.

3. The process for the preparation of the ethylene copolymer composition according to claim 1, wherein the ethylene copolymer composition has an ethylene content of from 50 to 99.9 wt. % and a comonomer content of from 0.1 to 50 wt. %.

4. The process according to claim 1, wherein the polymerization is carried out in gas-phase.

5. The process according to claim 1, wherein the catalyst component (B) producing the second polyethylene fraction comprises at least a Ziegler component B1) or an organometallic transition metal compound B2) of a transition metal of groups 3 to 12 of the Periodic Table or the lanthanides or a Phillips component B3).

6. The process according to claim 1, wherein at least one of catalyst components (A) and (B) and oligomerization catalyst component (C) are applied to a solid support.

7. The process according to claim 6, wherein catalyst components (A) and (B) and oligomerization catalyst component (C) are applied together to a common support.

8. The process according to claim 1, wherein component (A) is selected from the group consisting of: 2,6-bis[1-(2-chloro-4,6-dimethylphenylimino)ethyl]pyridine iron(II) chloride; 2,6-bis[1-(2-chloro-6-methylphenylimino)ethyl]pyridine iron(II) dichloride, 2,6-bis[1-(2,6-dichlorophenylimino)ethyl]pyridine iron(II) dichloride, 2,6-bis[1-(2,4-dichloro-6-methyl-phenylimino)ethyl]pyridine iron(II) dichloride, 2,6-bis[1-(2,6-difluorophenylimino)ethyl]-pyridine iron(II) dichloride, 2,6-bis[1-(2,6-dibromophenylimino)ethyl]-pyridine iron(II) dichloride, 2,6-bis[1-(2-fluoro-6-methylphenylimino)ethyl]pyridine iron(II) chloride, and 2,6-bis[1-(2-fluoro-4,6-dimethylphenylimino)ethyl]pyridine iron(II) chloride.

9. The process according to claim 1, wherein component (A) is 2,6-bis[1-(2-chloro-4,6-dimethylphenylimino)ethyl]pyridine iron(II) dichloride; Component B is an organometallic transition metal compound of a transition metal of groups 3-12 or the lanthanides; and Component C is 2,6-bis[1-(2-chloro-phenylimino)-ethyl]pyridine iron(II) dichloride.

* * * * *